United States Patent
Melchione et al.

(10) Patent No.: US 7,178,144 B2
(45) Date of Patent: Feb. 13, 2007

(54) SOFTWARE DISTRIBUTION VIA STAGES

(75) Inventors: Daniel Joseph Melchione, Beaverton, OR (US); Oyland Wong, Portland, OR (US); Ricky Y. Huang, Portland, OR (US); Charles Leslie Vigue, LaPine, OR (US)

(73) Assignee: Secure Resolutions, Inc., Mesa, AZ (US)

( * ) Notice: Subject to any disclaimer, the term of this patent is extended or adjusted under 35 U.S.C. 154(b) by 337 days.

(21) Appl. No.: 10/421,645

(22) Filed: Apr. 22, 2003

(65) Prior Publication Data

US 2004/0019889 A1   Jan. 29, 2004

Related U.S. Application Data

(60) Provisional application No. 60/375,215, filed on Apr. 23, 2002.

(51) Int. Cl.
*G06F 9/44* (2006.01)
*G06F 9/445* (2006.01)
*G06F 15/177* (2006.01)
*G06F 15/173* (2006.01)

(52) U.S. Cl. .............. 717/172; 717/170; 717/177; 709/223; 709/224; 709/221

(58) Field of Classification Search ............... 717/103, 717/168, 169–173, 176–178; 709/201, 203, 709/204; 707/106.1
See application file for complete search history.

(56) References Cited

U.S. PATENT DOCUMENTS

| 5,008,814 A * | 4/1991 | Mathur ............... 709/221 |
| 5,495,610 A | 2/1996 | Shing et al. |
| 5,778,231 A * | 7/1998 | van Hoff et al. ......... 717/143 |
| 5,781,535 A | 7/1998 | Russ et al. |
| 5,809,145 A | 9/1998 | Slik et al. |
| 6,029,147 A | 2/2000 | Horadan et al. |

(Continued)

FOREIGN PATENT DOCUMENTS

EP    0 811 942 A2    10/1997

(Continued)

OTHER PUBLICATIONS

"About Distribution Units," http://msdn.microsoft.com/workshop/delivery/download/overview/unit.asp, 3 pages, visited Apr. 1, 2002.

(Continued)

*Primary Examiner*—Antony Nguyen-Ba
(74) *Attorney, Agent, or Firm*—Klarquist Sparkman LLP

(57) ABSTRACT

Software can be automatically distributed in stages. An administrator can specify a stage indicating software to be distributed to nodes in a network. The nodes can be organized into groups. Administration functions can be performed via an application service provider scenario. For example, a browser-based user interface can be used to configure nodes and indicate an appropriate software stage for the nodes. Agent software at a node can query a data center to discover what software is appropriate. Software of the proper stage can be provided and installed. The software can be provided via an application service provider scenario, and automatic installation can be achieved even if the nodes are behind a firewall. A versionless arrangement can be implemented.

27 Claims, 29 Drawing Sheets

U.S. PATENT DOCUMENTS

| | | | |
|---|---|---|---|
| 6,029,196 | A | 2/2000 | Lenz |
| 6,029,256 | A | 2/2000 | Kouznetsov |
| 6,055,363 | A * | 4/2000 | Beals et al. ................. 709/201 |
| 6,083,281 | A * | 7/2000 | Diec et al. ................... 717/128 |
| 6,256,668 | B1 | 7/2001 | Slivka et al. |
| 6,266,811 | B1 | 7/2001 | Nabahi |
| 6,269,456 | B1 | 7/2001 | Hodges et al. |
| 6,336,139 | B1 * | 1/2002 | Feridun et al. ............. 709/224 |
| 6,385,641 | B1 * | 5/2002 | Jiang et al. ................. 709/203 |
| 6,442,694 | B1 | 8/2002 | Bergman et al. |
| 6,453,430 | B1 | 9/2002 | Singh et al. |
| 6,460,023 | B1 | 10/2002 | Bean et al. |
| 6,484,315 | B1 * | 11/2002 | Ziese ......................... 717/173 |
| 6,516,337 | B1 | 2/2003 | Tripp et al. |
| 6,516,416 | B2 | 2/2003 | Gregg et al. |
| 6,601,233 | B1 | 7/2003 | Underwood |
| 6,625,581 | B1 | 9/2003 | Perkowski |
| 6,671,818 | B1 * | 12/2003 | Mikurak ........................ 714/4 |
| 6,701,441 | B1 | 3/2004 | Balasubramaniam et al. |
| 6,704,933 | B1 * | 3/2004 | Tanaka et al. .............. 725/132 |
| 6,721,941 | B1 * | 4/2004 | Morshed et al. ............ 717/127 |
| 6,742,141 | B1 | 5/2004 | Miller |
| 6,760,903 | B1 * | 7/2004 | Morshed et al. ............ 717/130 |
| 6,782,527 | B1 * | 8/2004 | Kouznetsov et al. ........ 717/103 |
| 6,799,197 | B1 | 9/2004 | Shetty et al. |
| 6,826,698 | B1 | 11/2004 | Minskin et al. |
| 6,931,546 | B1 | 8/2005 | Kouznetsov et al. |
| 6,944,632 | B2 * | 9/2005 | Stern ....................... 707/104.1 |
| 2001/0007100 | A1 | 7/2001 | Revashetti et al. |
| 2002/0091819 | A1 | 7/2002 | Melchione et al. |
| 2002/0124072 | A1 | 9/2002 | Tormasov et al. |
| 2003/0027552 | A1 | 2/2003 | Kouznetsov |
| 2003/0028785 | A1 | 2/2003 | Pak et al. |
| 2003/0033536 | A1 | 2/2003 | Pak et al. |
| 2003/0065793 | A1 | 4/2003 | Kouznetsov et al. |
| 2003/0079145 | A1 | 4/2003 | Kouznetsov et al. |
| 2003/0084377 | A1 | 5/2003 | Parks et al. |
| 2003/0163471 | A1 | 8/2003 | Shah |
| 2004/0268120 | A1 | 12/2004 | Mirtal et al. |
| 2005/0004838 | A1 | 1/2005 | Perkowski et al. |

FOREIGN PATENT DOCUMENTS

| | | |
|---|---|---|
| EP | 0 811 942 A3 | 2/1999 |
| WO | WO 02/065282 A2 | 8/2002 |
| WO | WO 03/012644 A1 | 2/2003 |

OTHER PUBLICATIONS

"ActiveX Control," http://searchwinn2000.techtarget.com/s?efiniti?n/0,,sid1_gci211522,00.html, 2 pages, visited Mar. 29, 2002.
"ActiveX or How To Put Nuclear Bombs in Web Pages," http://www.halcyon.com/mclain/Activex/, 3 pages, visited Mar. 29, 2002.
Breese, "About (computer) virii," http://www.networking.tzo.com/net/briefs/virii.asp, 3 pages, visited Mar. 29, 2002.
"BrowserWatch ActiveX Arena!" http:/browserwatch.internet.com/Activex/Activex-big.html, 42 pages, visited Mar. 29, 2002.
"Frequently Asked Questions," http://www.placeware.com/support/faqs/1430.html, 2 pages, visited Mar. 29, 2002.
"Improving Productivity & Lowering Costs Through Asset Management and The Use of Network Management Tools," NetOctopus The Comprehensive System Administration Solution, 11 pages, 1999.
"Installing and Using The Summon Windows 95 Push Install," http:/netsys.syr.edu/micnet/sum?n_tech/push95.htm, 4 pages, visited Mar. 27, 2002.
"Installing VirusScan ASaP," http:/www.mcafeeasap.com/content/virusscan_asap/installing_virusscan._sp, 2 pages, visited Apr. 1, 2002.
"Internet Component Download," http://msdn.microsoft.com/workshop/delivery/download/overview/entry.asp?frame=true, 3 pages, visited Mar. 29, 2002.
McLain, "Runner Control—What's Runner?" http:/www.halcyon.com/mclain/ActiveX/Runner/welcome.html, 1 page, visited Mar. 29, 2002.
"On-Line Data Recovery Concept," http://www.finaldata.com/english/recover2_3.htm, 1 page, visited Mar. 29, 2002.
"Push Media," http://foldoc.doc.ic.?c.uk/foldoc/foldoc.cgi?push+medi, 1 page, visited Mar. 28, 2002.
"Uniform Resource Locator," htpp:/foldoc.doc.ic.?c.uk/fpldoc/foldoc.cgi?query=url, 1 page, visited Mar. 29, 2002.
"Using INF Files," http://msdn.microsoft.com/workshop/delivery/download/overview/inf.asp, 2 pages, Apr. 1, 2002.
"VirusScan ASaP Push Install Utility," http:/www.mcafeeasap.com/content/virusscan_asap/virusscan_push.asp, 1 page, visited Apr. 1, 2002.
"VirusScan ASaP Silent Install Pacakage," http:/www.mcafeeasap.com/content/virusscan_asap/virusscan_sfx.asp, 2 pages, visited Mar. 28, 2002.
"WebGuest Web Glossary," http:/www.google.com/search?q=c?che:p5L8LL?r?6IC:www.webguest.com/glossq.html+query+str. . . , 1 page, visited Mar. 29, 2002.
Salamone, "Electronic Software Distribution: Diamond in the Rough," Data Communications International, McGraw Hill, New York, vol. 22, No. 4, pp. 109-110, 113-114, 116, Mar. 1993.
"netOctopus Solutions: Smart Systems Management for Multi-Platform Environments," netopia® Product Brief, 3 pages, 1999.
"netOctopus: The Comprehensive System Administration Solution," netopia®, 11 pages, 1999.
Phillips, "Microsoft Windows XP: How to Run Legacy Applications Using Windows XP," Microsoft Corporation, 24 pages, Nov. 2001.
Templeton, "Microsoft Operations Manager 2000," Presentation by Microsoft New Zealand, 26 pages, Aug. 2001.
"VirusScan ASaP, Managed Anti-Virus Service for the Desktop Environment," McAfee, 56 pages, Mar. 29, 2002.
"Using Instant Updater to Update Your McAfee Product," McAfee Website, 1 page, visited Mar. 29, 2002.
"Error: 'Unable to run NAIKA.EXE'," McAfee Website, visited Mar. 29, 2002.
"Central Doesn't Open When I Run the Program," McAfee website, visited Mar. 29, 2002.
"How do I Test My VirusScan Installation? (Eicar)," McAfee website, visited Mar. 29, 2002.
"How to Set Firewall for Dial-up, DSL or Cable Modems," McAfee website, visited Mar. 29, 2002.
"Windows Appears to Hang at Startup on the Vshield Splash Screen," McAfee website, visited Mar. 29, 2002.
"My Computer Locks Up After Installing VirusScan," McAfee website, visited Mar. 29, 2002.
"Instructions on Upgrading VirusScan to Version 6," McAfee website, visited Mar. 29, 2002.
"Firewall Protection," McAfee ASaP Website, visited Mar. 29, 2002.
"A Complete Firewall Security Service that Monitors, Controls and Logs your Personal Computer's Network Activity," McAfee ASaP Website, visited Mar. 29, 2002.
"Free Trial," McAfee ASaP Website, visited Mar. 29, 2002.
"Features/Benefits," McAfee ASaP Website, visited Mar. 29, 2002.
McAfee ASaP Graphics ("System 1 Boots . . . "), McAfee ASaP Website, 3 1-page printouts, visited Mar. 29, 2002.
"Technical Frequently Asked Questions," McAfee ASaP Website, visited Mar. 29, 2002.
"VirusScan Managed Service Upgrade," McAfee ASaP Website, visited Mar. 29, 2002.
"An Online Service that Stops E-mail Borne Viruses and Infected Attachments before they enter Your Network," McAfee ASaP Website, visited Mar. 29, 2002.
"Features and Benefits," McAfee ASaP Website, visited Mar. 29, 2002.
"General Frequently Asked Questions," McAfee ASaP Website, visited Mar. 29, 2002.

"Technical Frequently Asked Questions," McAfee ASaP Website, visited Mar. 29, 2002.
"VirusScreen ASaP," McAfee ASaP Website, visited Mar. 29, 2002.
"VirusScreen ASaP System SnapShot," McAfee ASaP Website, 5 1-page printouts, visited Mar. 29, 2002.
"Frequently Asked Questions," McAfee ASaP Website, 3 pages, visited Mar. 29, 2002.
"VirusScan ASaP—FAQs," McAfee Support Website, 44 pages, visited Mar. 29, 2002.
Fisher, "e-Policy Orchestrator Walk Through", Version 1.91, 53 pages, Mar. 21, 2002.
"ePolicy Orchestrator," http://www.mcafeeb2b.com/products/epolicy/default.asp, 3 pages, visited Mar. 21, 2002.
"McAfee ePolicy Orchestrator," McAfee A Network Associates Company, 2 pages, 2001.
Marks, "McAfee Hits It Big with ASP Services," http://www.aspscope.com/articles/1239.htm, 2 pages, visited Mar. 21, 2002.
"McAfee Service Provider Program," McAfee, 6 pages, 2000.
"Trend Micro's InterScan VirusWall First Antivirus Product to be SunTon[sm] Certified for ASP Deployment," http://www.antivirus.com/corporate/media/2000/pr071800.htm, 3 pages, visited Mar. 21, 2002.
"Hosting Partner Program," http://www.mcafeeasap.com/content/partners/sp1.asp, 1 page, Mar. 21, 2002.
"A Web-based, Managed and Updated Anti-Virus Service for the Entire Desktop Environment," http://www.mcafeeasap.com/content/virusscan_asap/default.asp, 1 page, visited Mar. 21, 2002.
"Application Portals: Maximizing Existing Computing Resources in a Changing Business and Technology Environment," Delphi Group, 12 pages, Apr. 2001.
"McAfee's ePolicy Orchestrator Eliminates the Holes in the Enterprise's Anti-Virus Armor," Aberdeen Group, Inc., 8 pages, 2001.
"ePolicy Orchestratror," McAfee, 16 pages, Oct. 2001.
"A Web-based, Managed and Updated Anti-Virus Service for the Entire Desktop Environment," http://www.mcafeeasap.com/content/virusscan_asap/default.asp, 1 page, Mar. 29, 2002.
"Virus Protection," http://www.mcafeeasap.com/content/managed_services/default.asp, 2 pages, visited Mar. 29, 2002.
"Security HQ," hq.mcafeeasap.com/DEFAULT.asp, 2 pages, visited Mar. 29, 2002.
"McAfee ASaP Partners," http://www.mcafeeasap.com/content/partners/default.asp, 1 page, visited Mar. 29, 2002.
"McAfee ASaP Leverages the Internet to Manage Complex Security Functions for You," http://www.mcafeeasap.com/content/about/default.asp, 1 page, visited Mar. 29, 2002.

"Features and Benefits," http://www.mcafeeasap.com/content/virusscan_asap/features.asp, 2 pages, visited Mar. 29, 2002.
"VirusScan ASaP FAQ," http://www.mcafeeasap.com/content/virusscan_asap/faq.asp, 3 pages, visited Mar. 29, 2002.
"McAfee ASaP introdues Rumor—a new ASaP technology that uses file sharing distribution to manage anti-virus and firewall configurations updates," http://www.mcafeeasap.com/content/virusscan_asap/rumor.asp, 1 page, visited Mar. 29, 2002.
"Managing VirusScan ASaP," http://www.mcafeeasap.com/content/virusscan_asap/managing_virusscan.asp, 4 pages, visited Mar. 29, 2002.
"Installing VirusScan ASaP," http://www.mcafeeasap.com/content/virusscan_asap/installing_virusscan.asp, 2 pages, visited Mar. 29, 2002.
"VirusScan ASaP: How it Works," http://www.mcafeeasap.com/content/virusscan_asap/howitworks.asp, 1 page, visited Mar. 29. 2002.
"VirusScan ASaP Sample Reports," http://www.mcafeeasap.com/samplereports/virusscan/vslandingsamplereport.asp, 1 page, visited Mar. 29, 2002.
"Custom Anti-Virus Protection," http://www.mcafeeasap.com/content/managed_services/vscanmanage.asp, 1 page, visited Mar. 29, 2002.
"Customer Queries," http://www.mcafeeb2b.com/naicommmon/services/customer-support/customer-queries.asp, 2 pages, visited Mar. 29, 2002.
"McAfee PrimeSupport," http://www.mcafeeb2b.com/support/primesupport/default.asp, 2 pages, visited Mar. 29, 2002.
"McAfee VirusScan, Administrator's Guide," Version 4.5, 208 pages, Mar. 2000.
"McAfee VirusScan TC, Administrator's Guide," Version 6.0, 91 pages, Sep. 2000.
"VIREX, Anti-virus software for Macintosh computers, User's Guide," Version 6.0, 116 pages, Sep. 1999.
"What's a Timeout Error?," <http://www.postscript.org/FAQs/language/node23.html>, Nov. 11, 1999 version found via the Way Back Machine, 2 pages.
David L. Margulius, "Next-gen distributed computing," <http://www.infoworld.com/articles/fe/xml/02/04/01/020401febctci.html>, Mar. 29, 2002, 4 pages.
McAfee First Aid 2000 User's Guide, issued May 1999, 4 pages.

* cited by examiner

GROUP EDITOR

| GROUP (# OF COMPUTERS) | GROUP: SALES   POLICY: SALES POLICY |
|---|---|
| UNASSIGNED (5)  LAB (3)  ACCOUNTING (5)  SALES (273)  IT (10) | COMPUTER  OS       DOMAIN  SELECTED<br>SLS-10    WIN 9X   PDX     ☐<br>SLS-04    WIN NT   PDX     ☐<br>SLS-05    WIN NT   PDX     ☒<br>SLS-07    WIN NT   PDX     ☐<br>SLS-08    OS X     PDX     ☐<br><br>ADD   REMOVE |
| ADD GROUP<br>DELETE GROUP | APPLY |

| POLICY EDITOR | |
|---|---|
| POLICY LIST | POLICY DETAILS  AGENT DETAILS  SCHEDULED TASKS  ASSOCIATED GROUPS |
| SALES POLICY<br>LAB POLICY<br>DEFAULT POLICY<br><br>ADD POLICY<br>DELETE POLICY | POLICY DETAILS<br><br>POLICY NAME: [SALES POLICY]<br>LOCALE: [ENGLISH - U.S. ▼]<br>RELEASE STATE: [LIVE ▼]<br><br>APPLY |

```
┌─────────────────────────────────────────────┐
│              AGENT DETAILS                  │
├─────────────────────────────────────────────┤
│                                             │
│      SHOW AGENT UI:   [ SHOW      ▼ ]       │
│                                             │
│      SHOW EXIT OPTION: [ SHOW     ▼ ]       │
│                                             │
│      UPDATE INTERVAL:  [ 15 ] MINS          │
│                                             │
│      UPLOAD INTERVAL:  [ 15 ] MINS          │
│                                             │
│   DISTRIBUTED SERVER                        │
│      ENABLE FILE SHARING    ○ ON   ⊙ OFF    │
│      ENABLE PROXY           ○ ON   ⊙ OFF    │
│                                             │
│                   ( NEXT )                  │
│                                             │
└─────────────────────────────────────────────┘
```

FIG. 18A

VRASPAGENTPOLICIES

| COL NAME | TYPE | LEN | NULLS? | DEFAULT VAL | IDEN |
|---|---|---|---|---|---|
| 🔑 AGENTPOLICYID | INT | 4 | | | ✓ |
| POLICYID | UNIQUEIDENTIFIER | 16 | | | |
| SHOWAGENTUI | BIT | 1 | | (1) | |
| SHOWMENUEXIT | BIT | 1 | | (1) | |

FK_VRASPAGENTPOLICIES_VRASPPOLICIES (AA)

VRASPDISTRIBUTEDSERVERPOLICIES

| COL NAME | TYPE | LEN | NULLS? | DEFAULT VAL | IDEN |
|---|---|---|---|---|---|
| 🔑 DISTRIBUTEDSERVERPOLICYID | INT | 4 | | | ✓ |
| POLICYID | UNIQUEIDENTIFIER | 16 | | | |
| ENABLEFILESHARING | BIT | 1 | | (1) | |
| ENABLEPROXY | BIT | 1 | | (1) | |
| LASTMODIFIED | DATETIME | 8 | | (GETUTCDATE()) | |

FK_VRASPDISTRIBUTEDSERVERPOLICIES_VRASPPOLICIES (BB)

VRASPUPDATEPOLICIES

| COL NAME | TYPE | LEN | NULLS? | DEFAULT VAL | IDEN |
|---|---|---|---|---|---|
| 🔑 UPDATEPOLICYID | INT | 4 | | | ✓ |
| POLICYID | UNIQUEIDENTIFIER | 16 | | | |
| UPDATEINTERVAL | SMALLINT | 2 | | (15) | |
| LASTMODIFIED | DATETIME | 8 | | (GETUTCDATE()) | |

FK_VRASPUPDATEPOLICIES_VRASPPOLICIES (CC)

VRASPUPLOADPOLICIES

| COL NAME | TYPE | LEN | NULLS? | DEFAULT VAL | IDEN |
|---|---|---|---|---|---|
| 🔑 UPLOADPOLICYID | INT | 4 | | | ✓ |
| POLICYID | UNIQUEIDENTIFIER | 16 | | | |
| UPLOADINTERVAL | SMALLINT | 2 | | (15) | |
| LASTMODIFIED | DATETIME | 8 | | (GETUTCDATE()) | |

FK_VRASPUPLOADPOLICIES_VRASPPOLICIES (DD)

FIG. 18J

| VRASPVIRUSEVENTSLKP | | | | | |
|---|---|---|---|---|---|
| COL NAME | TYPE | LEN | NULLS? | DEFAULT VAL | IDEN |
| EVENTID | INT | 4 | | | |
| ORGID | UNIQUEIDENTIFIER | 16 | | | |
| GROUPID | UNIQUEIDENTIFIER | 16 | | | |
| NODEID | UNIQUEIDENTIFIER | 16 | | | |
| ORGNAME | NVARCHAR | 100 | | | |
| GROUPNAME | NVARCHAR | 50 | | | |
| NODENAME | NVARCHAR | 100 | | | |
| FILENAME | NVARCHAR | 300 | ✓ | | |
| VIRUSNAME | NVARCHAR | 50 | ✓ | | |
| STATUS | NVARCHAR | 50 | ✓ | | |
| VIRUSTYPE | NVARCHAR | 50 | ✓ | | |
| DETECTEDMETHOD | NVARCHAR | 50 | ✓ | | |
| CAPTUREDON | DATETIME | 8 | ✓ | | |
| UTCOFFSET | NCHAR | 6 | ✓ | | |
| CLEANABLE | BIT | 1 | ✓ | | |

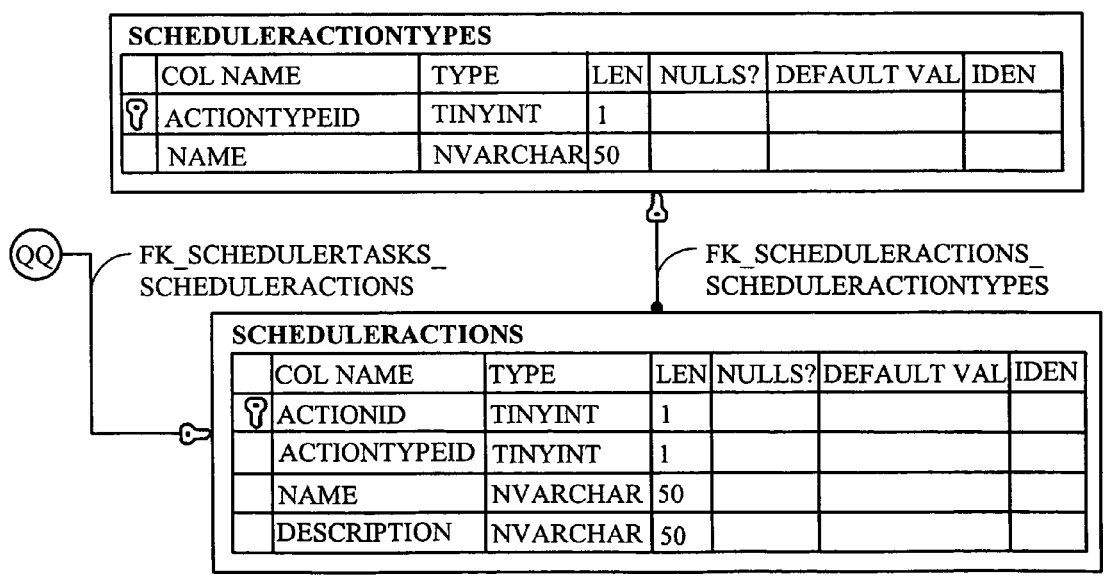

SOFTWARE DISTRIBUTION VIA STAGES

PRIORITY CLAIM

This application claims the benefit of U.S. Provisional Patent Application No. 60/375,215, filed Apr. 23, 2002, which is hereby incorporated herein by reference.

CROSS-REFERENCE TO OTHER APPLICATIONS

The U.S. provisional patent applications No. 60/375,216, Huang et al., entitled, "Software Administration in an Application Service Provider Scenario via Configuration Directives"; No. 60/375,176, Vigue et al., entitled, "Fault-tolerant Distributed Computing Applications"; No. 60/375,174, Melchione et al., entitled, "Providing Access To Software Over a Network via Keys"; No. 60/375,154, Melchione et al., entitled, "Distributed Server Software Distribution,"; and No. 60/375,210, Melchione et al., entitled, "Executing Software In A Network Environment"; all filed Apr. 23, 2002, are hereby incorporated herein by reference.

TECHNICAL FIELD

The invention relates to software distribution and, more particularly, to software distribution in stages across a network of nodes such as computers.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Organizations have become increasingly dependent on computers to maintain high levels of productivity. Administering a large number of computers in an organization can be a burdensome task. The burden is further compounded when the computers are scattered throughout various locations and departments of the organization.

One particularly challenging aspect of computer administration relates to software upgrades. It may be desirable to adopt new or upgraded software to take advantage of new or enhanced functionality. However, when software is installed, unanticipated problems may arise. Such problems can range from minor annoyances to a complete disruption of functionality.

As a result, those responsible for the administration of an organization's computers may be reluctant to install new software until after they have had an opportunity to test the effect of installing the software. During testing, solutions for overcoming disruptions can be found, or it may be discovered that the software needs further work by the software developer.

Software installation to a set of computers in an organization is thus a burdensome task that can disrupt an organization if not properly implemented. Improvements in the field of software installation are needed.

SUMMARY

The above issues can be problematic to administrators, whether they manage a small network or an enterprise having thousands of computers spread over multiple locations.

Software can be automatically distributed to nodes in a network. However, automatic installation can cause its own problems. For example, if installation of the software is causing disruption, automatic installation simply automatically disrupts the organization.

In various embodiments described herein, software can be released in a plurality of stages. For example, one or more nodes of a network can be designated as to be distributed software of a particular stage. When software is to be distributed to a node, a software release associated with the specified stage is selected for distribution. To assist in administration, nodes can be placed in groups, and the groups can be associated with a particular stage to associate nodes in the group with the stage.

In some embodiments, software administration can be accomplished via an application service provider scenario. For example, nodes can be placed in groups via an application service provider scenario, and the groups can be associated with a stage via an application service provider scenario.

In an application service provider scenario, communication between nodes and an application service provider data center can be accomplished via an HTTP-based protocol. A node can include an agent that periodically queries the application service provider data center to discover which software is to be installed on the node. In this way, software distribution can be accomplished even if the nodes are behind a firewall. For example, if a query comes from a node, a response can be sent based on the node's identity and a stage associated with it.

When software of a particular stage becomes available, a database can be updated appropriately, and automated distribution of the software takes place according to whether a node is designated as to be distributed software of the stage. A versionless arrangement can be implemented whereby software versions are transparent to the administrator.

A distribution threshold can be designated in some arrangements to specify a threshold within a stage. The distribution threshold can be helpful in avoiding high peaks in network traffic.

An appropriate stage can be incorporated into a set of configuration directives and associated with a group of nodes to facilitate software administration. If desired, an application service provider scenario can be used to specify the configuration directives and associate them with a group of nodes.

Responsibilities for various portions of the system can be divided so that an application service provider controls various aspects to relieve software administrators of various duties.

Additional features and advantages will be made apparent from the following detailed description of illustrated embodiments, which proceeds with reference to the accompanying drawings.

BRIEF DESCRIPTION OF THE DRAWINGS

FIG. 13 is a screen shot showing an exemplary user interface for manipulating groups.

FIG. 14 is a screen shot showing an exemplary user interface for manipulating policies.

FIG. 15 is a screen shot showing an exemplary user interface for manipulating configuration directives related to an agent.

FIGS. 18A–18J show an exemplary database schema for use with an implementation of the technologies described herein.

DETAILED DESCRIPTION

Application Service Provider Overview

The embodiments described herein can be implemented in an application service provider scenario. In particular embodiments, software administration can be accomplished via an application service provider scenario.

Figure 1:
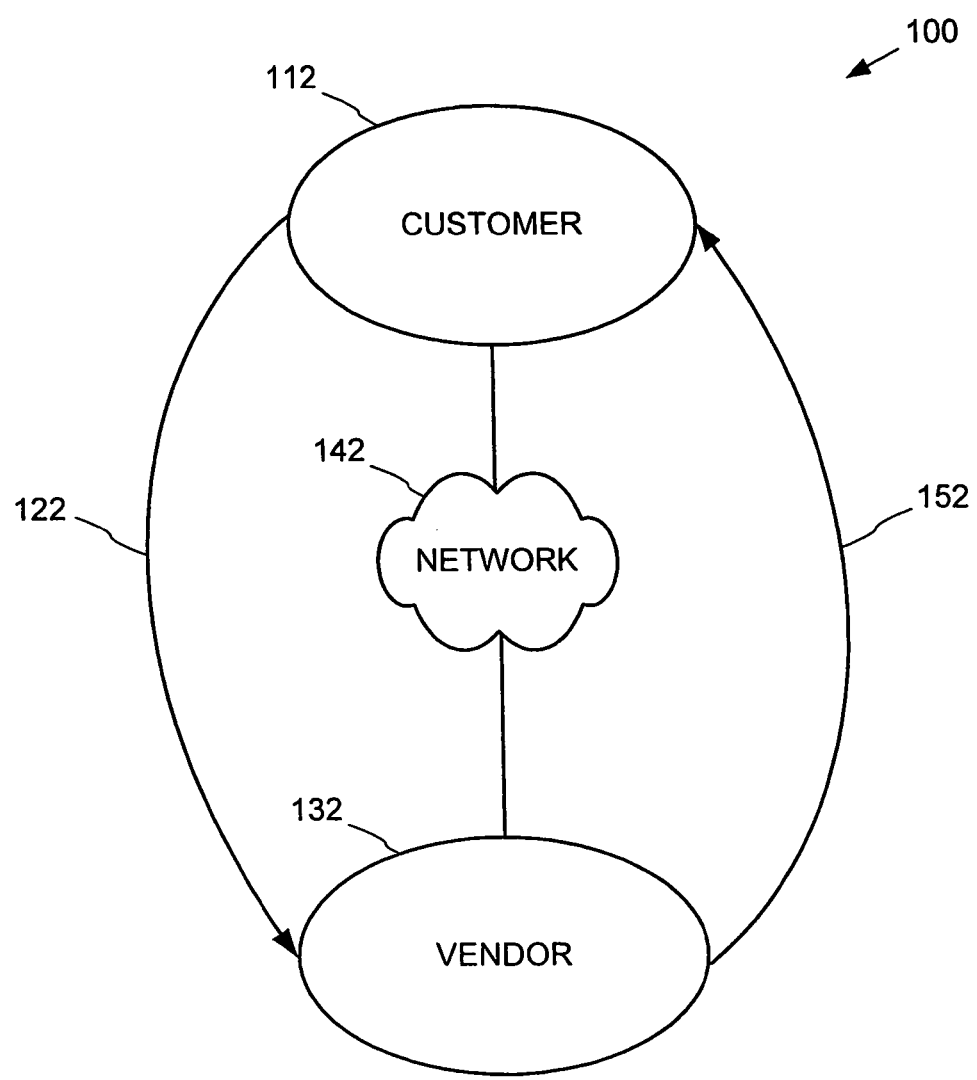
FIG. 1 is an illustration of an exemplary application service provider scenario.

An exemplary application service provider scenario 100 is shown in FIG. 1. In the scenario 100, a customer 112 sends requests 122 for application services to an application service provider vendor 132 via a network 142. In response, the vendor 132 provides application services 152 via the network 142. The application services 152 can take many forms for accomplishing computing tasks related to a software application or other software.

To accomplish the arrangement shown, a variety of approaches can be implemented. For example, the application services can include delivery of graphical user interface elements (e.g., hyperlinks, graphical checkboxes, graphical pushbuttons, and graphical form fields) which can be manipulated by a pointing device such as a mouse. Other application services can take other forms, such as sending directives or other communications to devices of the vendor 132.

To accomplish delivery of the application services 152, a customer 112 can use client software such as a web browser to access a data center associated with the vendor 132 via a web protocol such as an HTTP-based protocol (e.g., HTTP or HTTPS). Requests for services can be accomplished by activating user interface elements (e.g., those acquired by an application service or otherwise) or automatically (e.g., periodically or as otherwise scheduled) by software. In such an arrangement, a variety of networks (e.g., the Internet) can be used to deliver the application services (e.g., web pages conforming to HTML or some extension thereof) 152 in response to the requests. One or more clients can be executed on one or more devices having access to the network 142. In some cases, the requests 122 and services 152 can take different forms, including communication to software other than a web browser.

Figure 2:
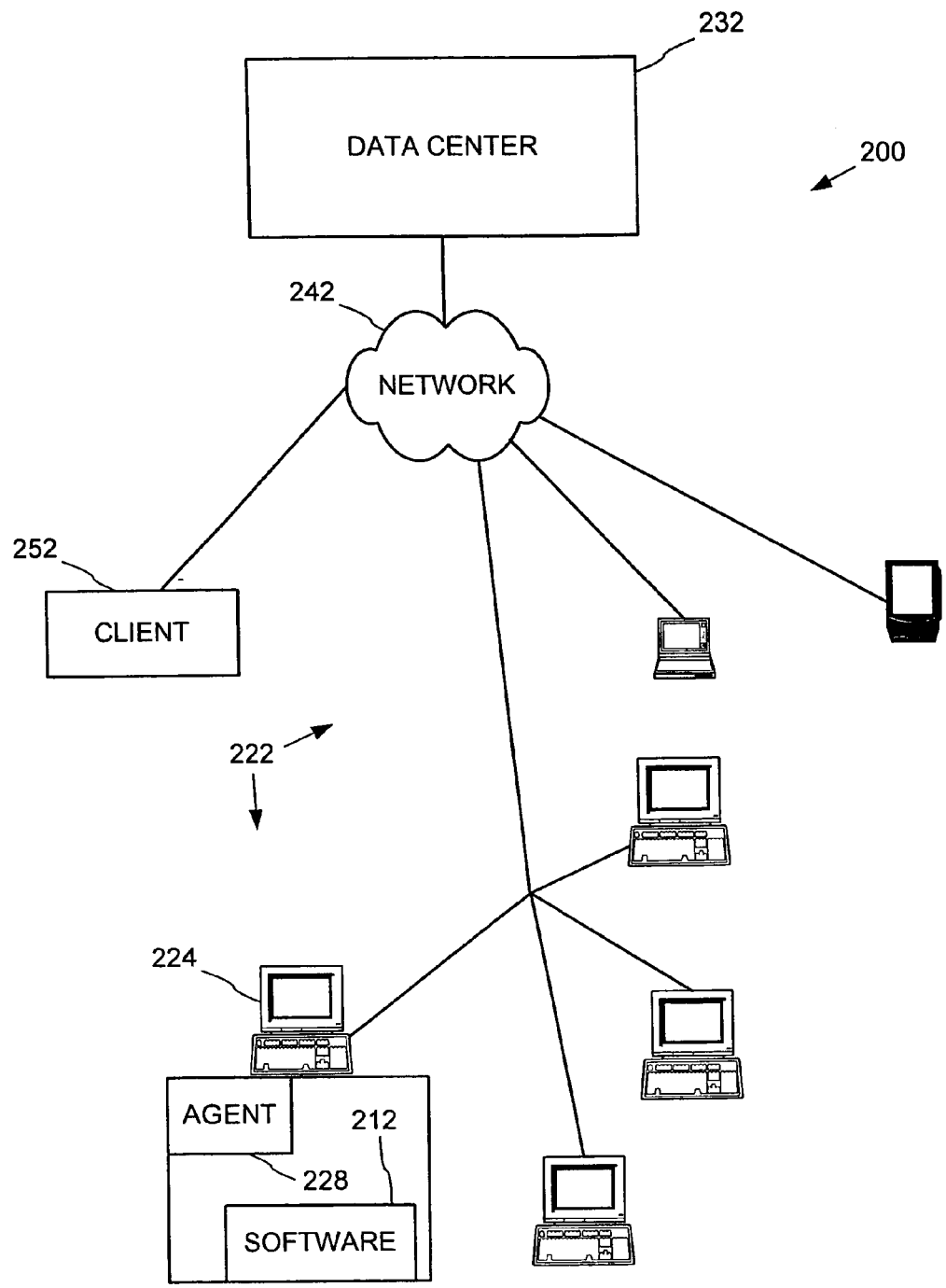
FIG. 2 is an illustration of an exemplary arrangement by which software administration can be accomplished via an application service provider scenario.

The technologies described herein can be used to administer software (e.g., one or more applications) across a set of administered devices via an application services provider scenario. Administration of software can include software installation, software configuration, software management, or some combination thereof. FIG. 2 shows an exemplary arrangement 200 whereby an application service provider provides services for administering software (e.g., administered software 212) across a set of administered devices 222. The administered devices 222 are sometimes called "nodes."

In the arrangement 200, the application service provider provides services for administrating instances of the software 212 via a data center 232. The data center 232 can be an array of hardware at one location or distributed over a variety of locations remote to the customer. Such hardware can include routers, web servers, database servers, mass storage, and other technologies appropriate for providing application services via the network 242. Alternatively, the data center 232 can be located at a customer's site or sites. In some arrangements, the data center 232 can be operated by the customer itself (e.g., by an information technology department of an organization).

The customer can make use of one or more client machines 252 to access the data center 232 via an application service provider scenario. For example, the client machine 252 can execute a web browser, such as MICROSOFT INTERNET EXPLORER, which is marketed by MICROSOFT Corporation of Redmond, Wash. In some cases, the client machine 252 may also be an administered device 222.

The administered devices 222 can include any of a wide variety of hardware devices, including desktop computers, server computers, notebook computers, handheld devices, programmable peripherals, and mobile telecommunication devices (e.g., mobile telephones). For example, a computer 224 may be a desktop computer running an instance of the administered software 212.

The computer 224 may also include an agent 228 for communicating with the data center 232 to assist in administration of the administered software 212. In an application service provider scenario, the agent 228 can communicate via any number of protocols, including HTTP-based protocols.

The administered devices 222 can run a variety of operating systems, such as the MICROSOFT WINDOWS family of operating systems marketed by MICROSOFT Corporation; the Mac OS family of operating systems marketed by APPLE Computer Incorporated of Cupertino, Calif.; and others. Various versions of the operating systems can be scattered throughout the devices 222.

The administered software 212 can include one or more applications or other software having any of a variety of business, personal, or entertainment functionality. For example, one or more anti-virus, banking, tax return preparation, farming, travel, database, searching, multimedia, security (e.g., firewall) and educational applications can be administered. Although the example shows that an application can be managed over many nodes, the application can appear on one or more nodes.

In the example, the administered software 212 includes functionality that resides locally to the computer 224. For example, various software components, files, and other items can be acquired by any of a number of methods and reside in a computer-readable medium (e.g., memory, disk, or other computer-readable medium) local to the computer 224. The administered software 212 can include instructions executable by a computer and other supporting information. Various versions of the administered software 212 can appear on the different devices 222, and some of the devices 222 may be configured to not include the software 212.

Figure 3:
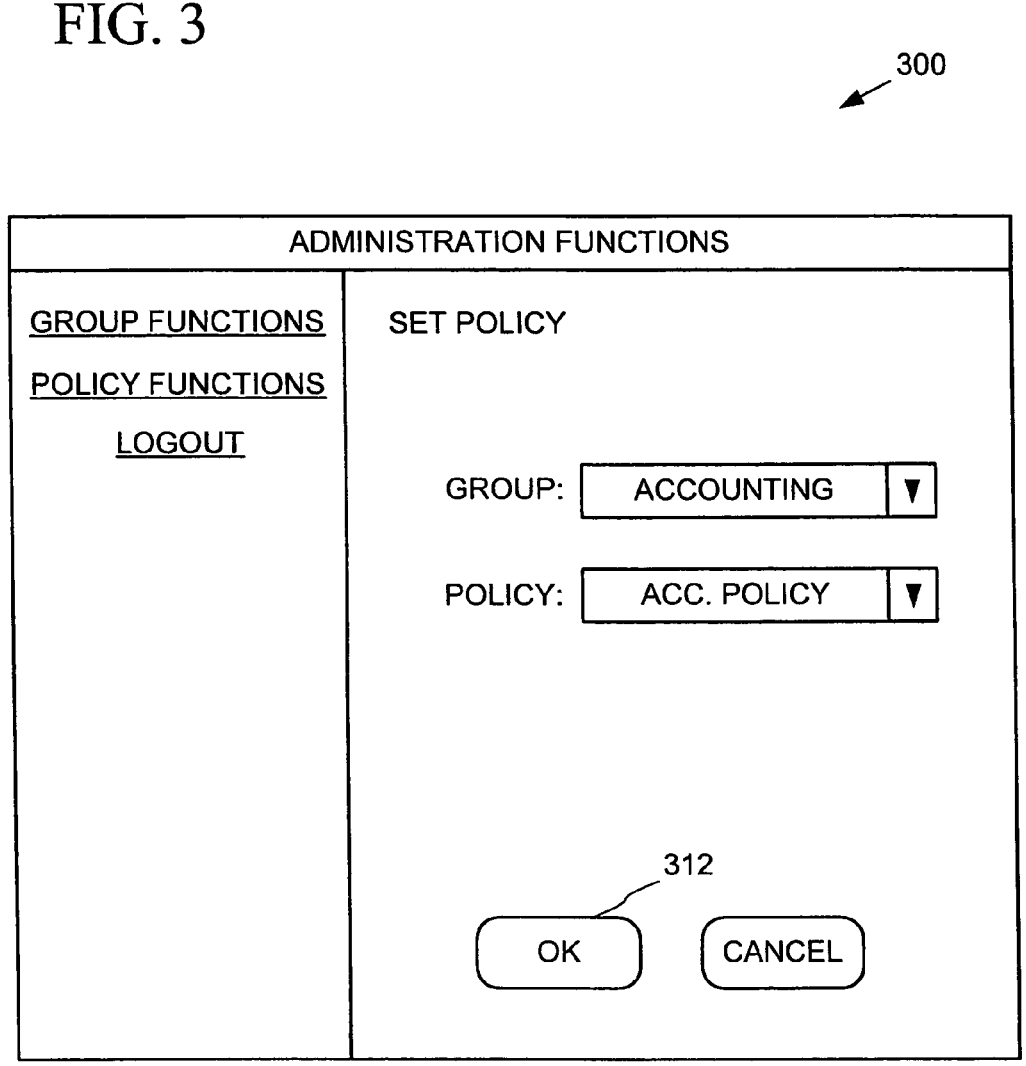
FIG. 3 depicts an exemplary user interface by which software administration can be accomplished in an application service provider scenario.

FIG. 3 shows an exemplary user interface 300 presented at the client machine 252 by which an administrator can administer software for the devices 222 via an application service provider scenario. In the example, one or more directives can be bundled into a set of directives called a "policy." In the example, an administrator is presented with an interface by which a policy can be applied to a group of devices (e.g., a selected subset of the devices 222). In this way, the administrator can control various administration functions (e.g., installation, configuration, and management of the administered software 212) for the devices 222. In the example, the illustrated user interface 300 is presented in a web browser via an Internet connection to a data center (e.g., as shown in FIG. 2) via an HTTP-based protocol.

Activation of a graphical user interface element (e.g., element 312) can cause a request for application services to be sent. For example, application of a policy to a group of devices may result in automated installation, configuration, or management of indicated software for the devices in the group.

In the examples, the data center 232 can be operated by an entity other than the application service provider vendor. For example, the customer may deal directly with the vendor to handle setup and billing for the application services. However, the data center 232 can be managed by another party, such as an entity with technical expertise in application service provider technology.

Figure 4:
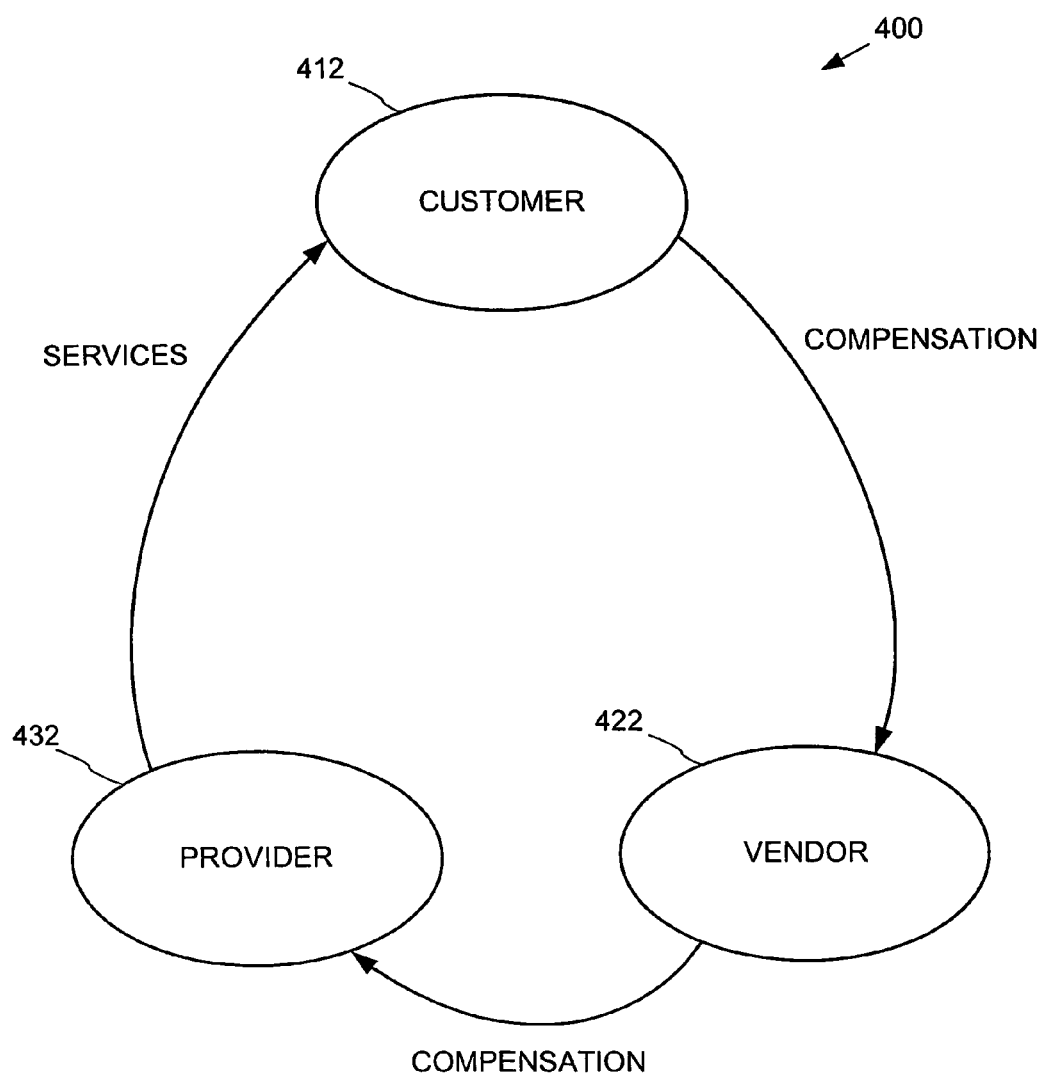
FIG. 4 illustrates an exemplary business relationship accompanying an application service provider scenario, such as that shown in FIG. 1 or 2.

The scenario 100 (FIG. 1) can be accompanied by a business relationship between the customer 112 and the vendor 132. An exemplary relationship 400 between the various entities is shown in FIG. 4. In the example, a customer 412 provides compensation to an application services provider vendor 422. Compensation can take many forms (e.g., a monthly subscription, compensation based on utilized bandwidth, compensation based on number of uses, or some other arrangement (e.g., via contract)). The provider of application services 432 manages the technical details related to providing application services to the customer 412 and is said to "host" the application services. In return, the provider 432 is compensated by the vendor 422.

The relationship 400 can grow out of a variety of situations. For example, it may be that the vendor 422 has a relationship with or is itself a software development entity with a collection of application software desired by the customer 412. The provider 432 can have a relationship with an entity (or itself be an entity) with technical expertise for incorporating the application software into an infrastructure by which the application software can be administered via an application services provider scenario such as that shown in FIG. 2.

Although not shown, other parties may participate in the relationship 400. For example, network connectivity may be provided by another party such as an Internet service provider. In some cases, the vendor 422 and the provider 432 may be the same entity. It is also possible that the customer 412 and the provider 432 be the same entity (e.g., the provider 432 may be the information technology department of a corporate customer 412).

EXAMPLE 1

Exemplary System Overview

Figure 5:
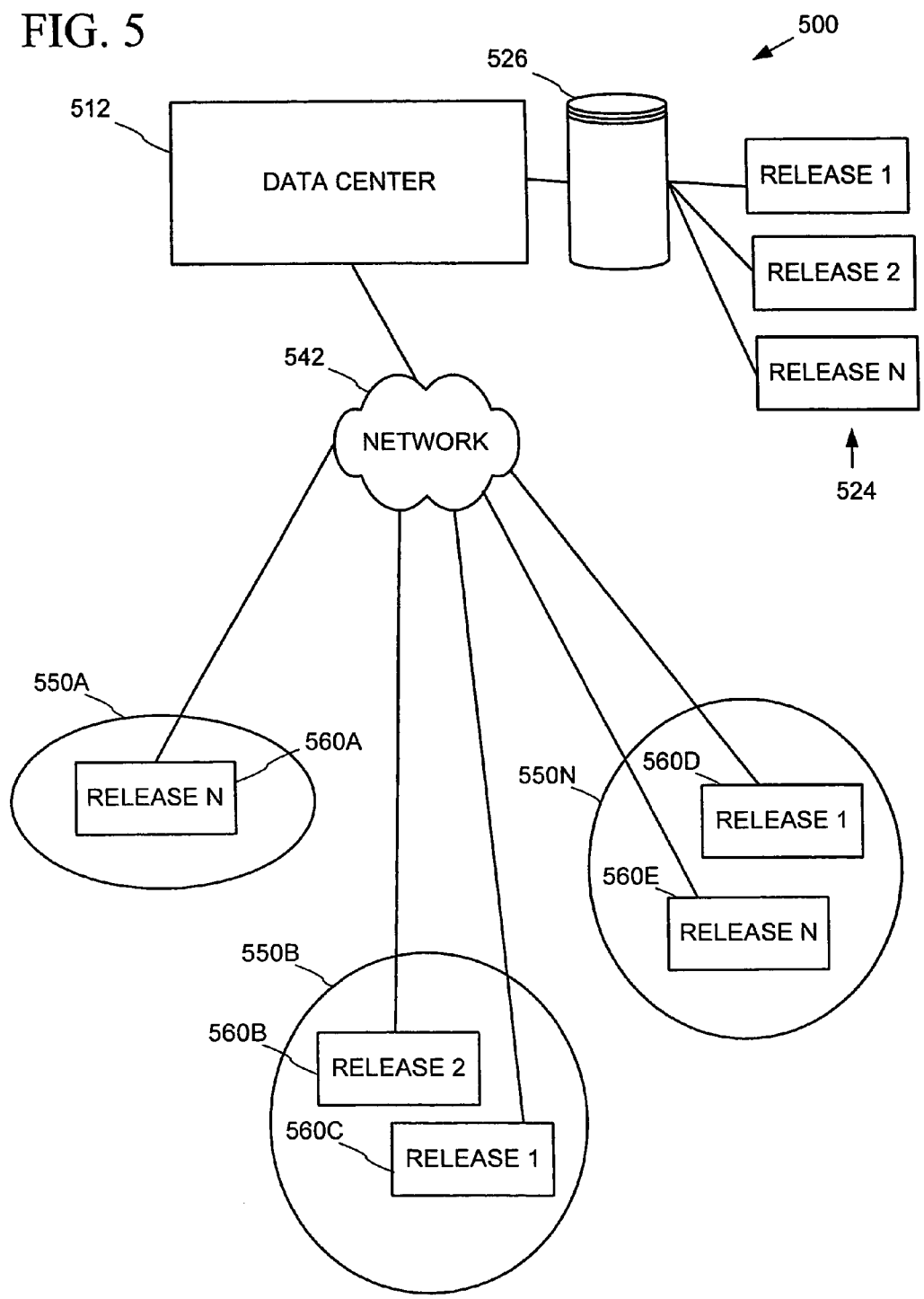
FIG. 5 shows an exemplary system by which software is distributed via stages.

FIG. 5 depicts an overview of an exemplary system 500 by which software can be distributed via stages. In the arrangement, a data center 512 keeps a record of releases 524 in a database 526. The releases can be associated with a particular stage (e.g., stages 1-n). Based on the stage associated with a software release, the software is distributed via a network 542 (e.g., the Internet), to various sites (e.g., the sites 550A, 550B, and 550N), which may be associated with a particular customer or customers.

Accordingly, different releases may appear at different sets of nodes within the system 500. In the example, a set of nodes 560A is distributed release n, some nodes 560B at site 550B are distributed release 2, while other nodes 560C at the same site are distributed release 1. At site 550C, some nodes 560D are distributed release 1, while others 560E are distributed release n. It may take time for a release to percolate through the system after it is released, so a set of machines may have a mixture of releases.

The releases can be of different versions. For example, release 1 could be a mature release of version 1.3 of a program, release 2 could be an early release of version 1.3 of the program, and release n could be an initial (e.g., beta) release of version 2.0 of the program. Instead of, or in addition to, a version number, a timestamp can be used. The system can appear to be versionless in that an administrator need not be concerned with the version of the software.

Distribution of the releases can be accomplished in any number of ways. For example, in a scenario supporting software administration, an administrator can specify which nodes are to receive which releases. Automated processing can then handle the details of distributing the software to the appropriate nodes. To relieve network congestion, the releases 524 may reside at a location other than the data center 512, and the data center 512 can provide a reference (e.g., an URL) to the releases 524 to accomplish release distribution.

In the example, the releases can be categorized according to stage. As software progresses in its life cycle, it typically moves from an initial stage to a later stage. After a release is made available to the system, a determination of which release is appropriate for a node can be made by consulting information that has been previously specified by an administrator to indicate which nodes are to receive software of which stage. For example, a database (e.g., the database 526)

can associate a node or group of nodes with a stage, and the releases can also be associated with a stage.

Accordingly, distribution can be handled automatically when a release is made available to the system. In this way, administration of the software can be greatly improved, and system administrators can avoid the burden of software distribution. Because a stage can be specified by an administrator, initial (e.g., beta) versions of software can be specified for a small set of nodes (e.g., in a lab or quality assurance team). The performance and behavior of the beta software can be evaluated before a later version moves to other nodes in the network.

The illustrated system can use the Internet for the network 542. Also, administration can be performed via an application service provider (or "ASP") scenario (e.g., via the Internet or some other network).

EXAMPLE 2

Exemplary Software Stages

Figure 6:
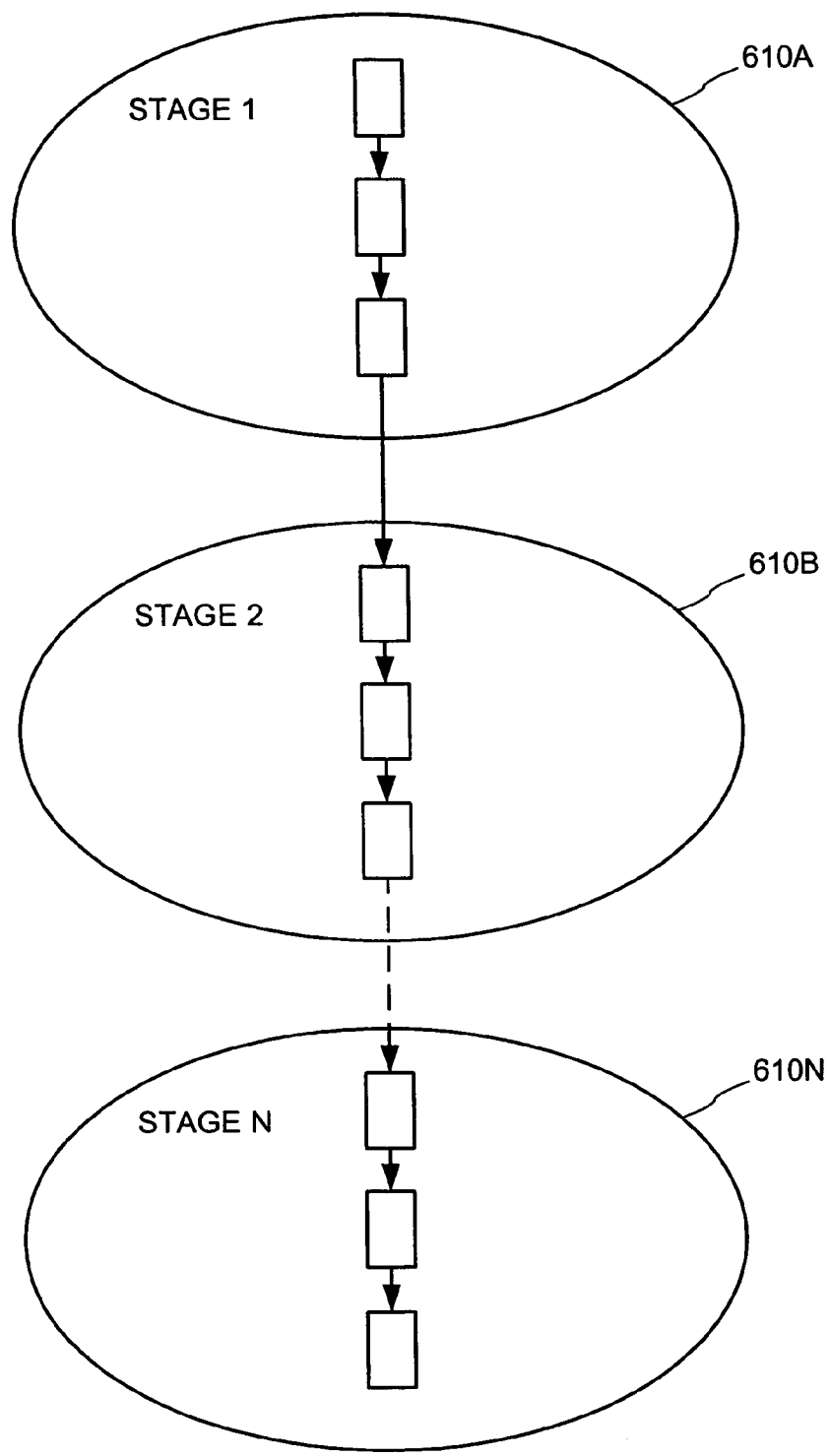
FIG. 6 illustrates software releases categorized according to stage.

FIG. 6 shows an exemplary set of software stages. In the example, software progresses through the n stages 610A, 610B, and 610N. A first release of the software is typically not fully functional or not fully properly functional and is associated with an initial stage (e.g. stage 610A). As modifications are made to the software, it becomes closer to a finished stage and is associated with a later stage (e.g., stage 610B). Eventually, the software reaches a level of maturity appropriate for an even later stage (e.g., stage 610N).

As software proceeds through the stages, any number of modifications can be made, including fixes for erroneous logic (e.g., bugs) and addition of new or enhanced functionality. It may be that more than one release is associated with a particular stage. As the software progresses through the stages, it may be assigned different version numbers (e.g., $1.0\alpha$, $1.0\beta2$, $1.0rc1$, $1.0$, $1.01$, $1.2$, etc.). At some point, a decision may be made whereby the entire cycle is started again, and the software returns to an early stage. Sometimes such a situation is called releasing a new version or new major version. The version numbers may be adjusted accordingly (e.g., $2.0\alpha$, $2.0\beta2$, $2.0rc1$, $2.0$, $2.01$, $2.2$, etc.). A variety of other version schemes can be used (e.g., a major and a minor version number, a time stamp, or both).

During software development, a software team may continue to work on the software, but a later release can be categorized in an earlier stage. For example, new, untested functionality may be incorporated that causes the software to be categorized as a beta release, even though an earlier release of the same software had progressed beyond the beta stage.

If appropriate, a numerical system can be used to classify the releases into an appropriate stage. For example, software having up to 70% functionality can be classified in a first stage, and software having 95% functionality can be graduated to a second stage, and so on.

The software stages can be associated with appropriate identifiers. For example, a database table can contain a row for a software stage.

EXAMPLE 3

Distribution Threshold

If desired, a distribution threshold can be used within a stage. A distribution threshold can be helpful for avoiding network congestion related to distributing software of a particular stage. For example, when a software release of a particular stage becomes available, there may be a large number of nodes slated to receive the release. Accordingly, network congestion can develop as the software is distributed to the appropriate nodes.

A distribution threshold can be used to stagger the distribution over time. For example, nodes in a particular organization, network, subnet, or other division can be assigned a distribution threshold (e.g., between 0 and 999). When a release first becomes available, a progressing index parameter can be used to stagger distribution according to the distribution threshold. The distribution threshold can be controlled by the customer, a vendor, or the operator of a data center. In some cases, a customer may provide additional compensation to be awarded a particular distribution threshold (e.g., a particularly early or a particularly late threshold).

The index parameter can start at a low number and progress to a higher number over time. As the parameter reaches the distribution threshold for a set of nodes, the software is then distributed (or selected for distribution) to the appropriate nodes. The parameter can be controlled by the customer, a vendor, or the operator of a data center. In some cases, it may be appropriate to reduce or reset the parameter.

In this way, the distribution threshold can be used to avoid spikes in network traffic.

Figure 7:
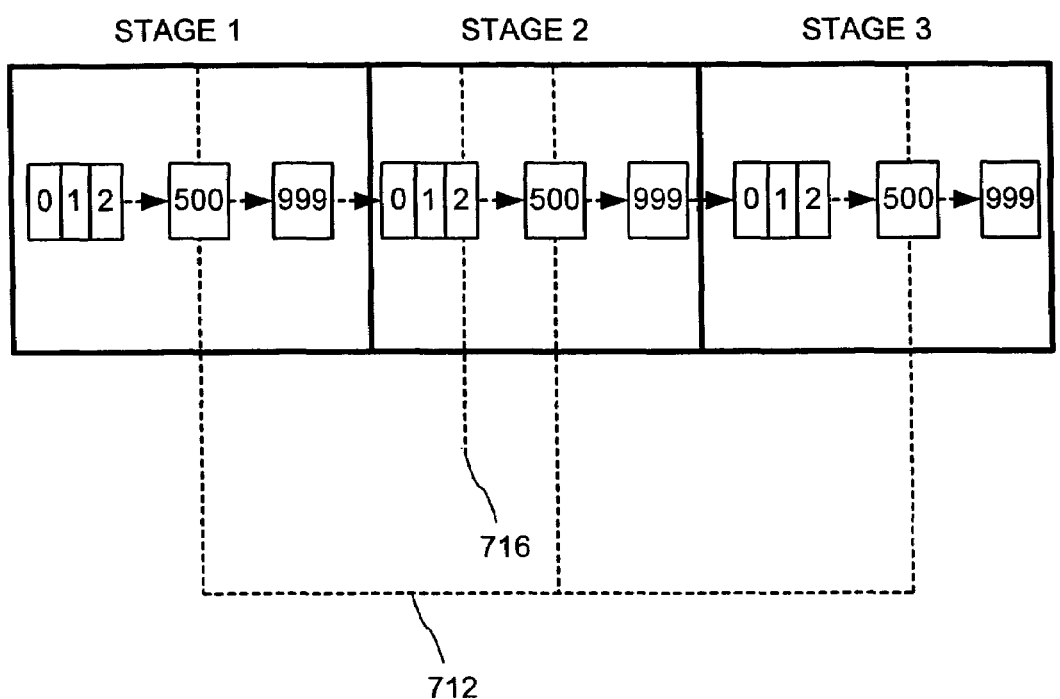
FIG. 7 depicts an exemplary arrangement using distribution indices.

FIG. 7 depicts an exemplary arrangement involving distribution thresholds. In the example, there are three stages, and an organization has been assigned a distribution threshold of 500 712. Accordingly, when a distribution-controlling parameter reaches a value of 500 or higher, software of stage 1, if any, is distributed to nodes within the organization designated as to receive software of stage 1.

In the example, a node has been assigned a distribution threshold of 2 716. Accordingly, when the controlling parameter reaches a value of 2 or higher, software of stage 2, if any, is distributed to the node.

The distribution threshold can be uniform throughout each stage for a set of nodes, or the distribution threshold can take a different position within each stage if desired. Similarly, the parameter controlling distribution can also be used across plural stages, or a separate parameter can be used for each stage. If finer granularity is desired, a sub-threshold may be used.

Alternatively, a distribution threshold can be assigned per release. When the index parameter reaches the distribution threshold for the release, it is then selected for distribution to the appropriate nodes.

EXAMPLE 4

Selecting Appropriate Software

When selecting which software is appropriate for a node, any number of schemes can be used. For example, based on the stage and threshold associated with a node, a release may be chosen. It may be desirable to distribute software of the specified stage or later. For example, in the case of a node assigned stage 1, it may be desirable to select stage 1 software if available, but stage 2 software can be selected if available. In such a scenario, software of a later version may be specified as separate software to prevent confusion between versions (e.g., confusion between a mature release of version 1.0 and an initial release of version 2.0). In a versionless system, a the version number need not be disclosed to the users or software administrators. Alternatively, a date can be used (e.g., the most recent software out of the appropriate stages is sent or the most recent software is sent).

An indication of selected software can be interpreted as a directive to uninstall software not specified. For example, upon an initial release of version 2.0 for a node specified as associated with stage 1, an indication that version 2.0 is appropriate can be interpreted as a directive to uninstall the version 1.0 software).

EXAMPLE 5

Incorporating Software Functionality into an ASP Scenario

Figure 8:
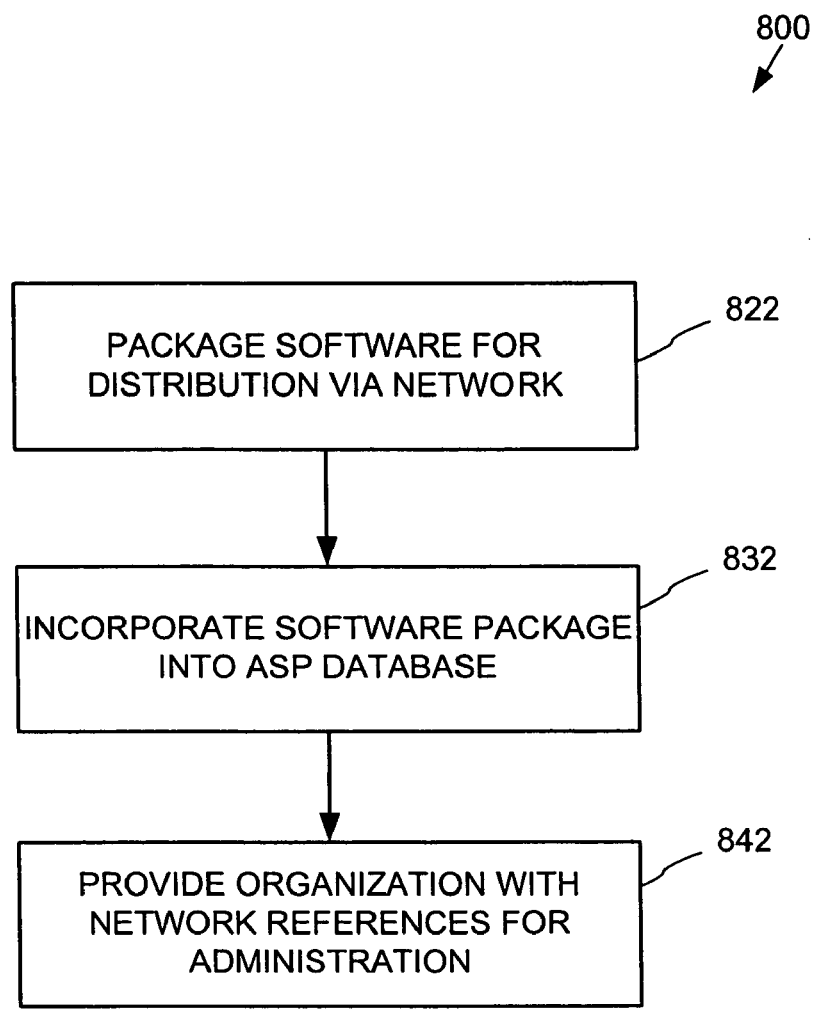
FIG. 8 is a flow chart showing an exemplary method of incorporating software functionality into a system by which the software can be administered via an application service provider scenario.

In some cases, it may be desirable to take an arbitrary piece of software and incorporate it into a system by which the software can be administered via an application service provider scenario. FIG. 8 is a flow chart showing a method 800 for accomplishing such an arrangement. The method 800 can be performed by the developer of the software or an entity specializing in application service provider scenarios which works in tandem with the software developer.

At 822, the software is packaged for distribution over a network. For example, software components and an installation program can be assembled into a package (e.g., according to the CAB file specification of Microsoft Corporation).

At 832, the software package is incorporated into a database maintained by the application service provider (e.g., the database 526). The software package itself may reside at a separate location, and a reference to the package can be incorporated into the database.

At 842, the organization wishing to avail itself of software administration via the application service provider scenario is provided with appropriate network references (e.g., URL's) by which the organization can access the application services for administering the software throughout its locations.

As described below, the network references can be sufficient for accomplishing administration via an application provider service scenario. For example, an administrator can configure a network so that software can be distributed as described herein via the network references. In this way, distribution of software via conventional media (e.g., diskettes or CD's) can be avoided.

EXAMPLE 6

Application Service Provider Scenarios

Providing software administration services via an application service provider scenario can be challenging because typical network connections include security measures that inhibit various functionality. For example, while it may be possible to install software to a remote machine, doing so over the Internet is typically not possible because organizations employ a firewall by which certain directives originating outside the firewall are not allowed to arrive at machines inside the firewall.

One way to accomplish administration via an application service provider scenario is to use a protocol which has been designated as relatively safe and is typically allowed to pass through the firewall (e.g., an HTTP-based protocol). Some functions related to administration can be accomplished in other ways, such as via distribution of programs embedded in or referred to within relatively safe protocols (e.g., a control conforming to the ActiveX specification of Microsoft Corporation embedded in a web page). Other arrangements are possible. For example, in a scenario in which the application service provider (e.g., an IT department) maintains a data center within the firewall, other protocols may be used. However, an HTTP-based protocol can also be used in such a scenario.

Figure 9:
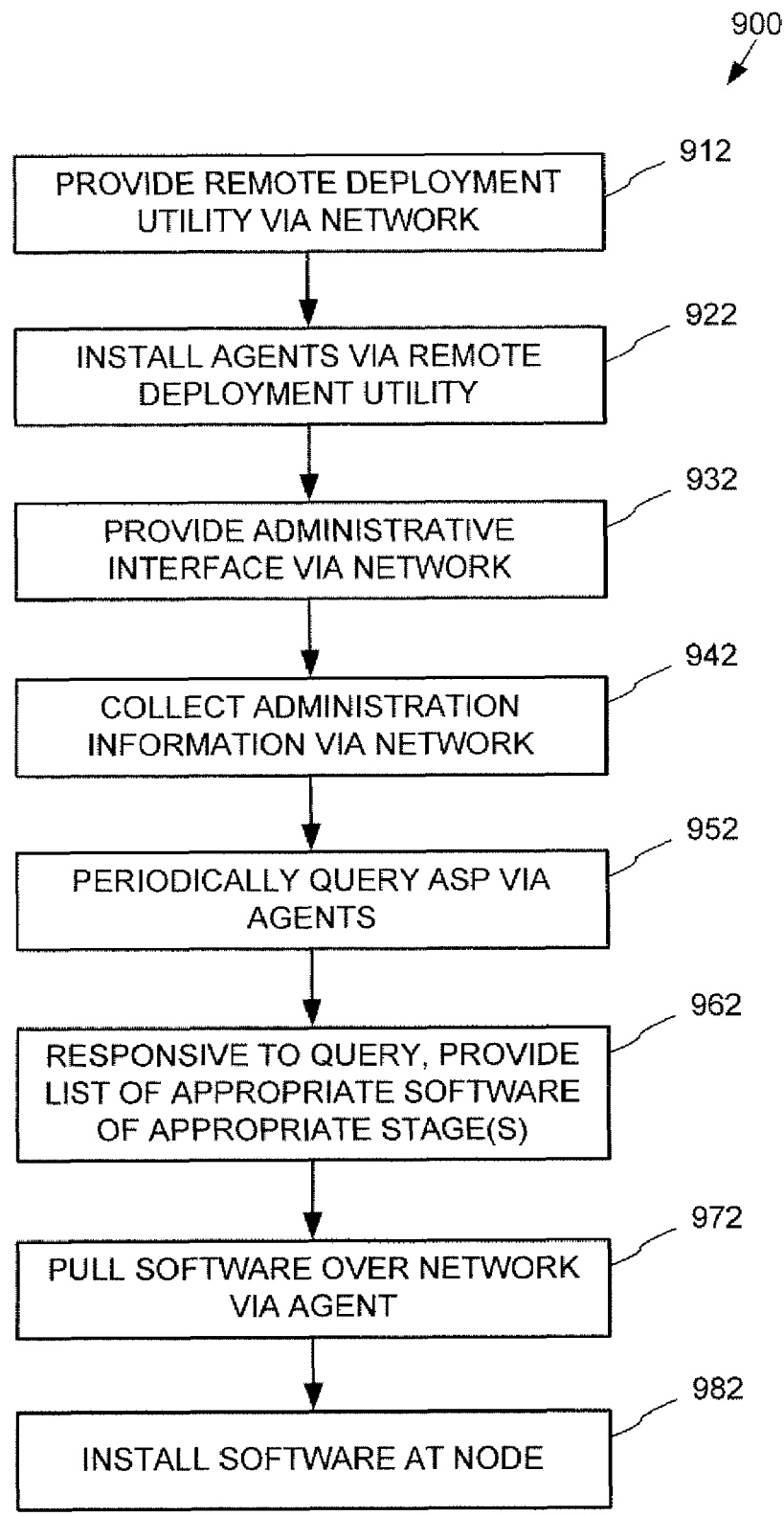
FIG. 9 is a flow chart depicting an exemplary method for accomplishing software administration via an application service provider scenario.

FIG. 9 shows an exemplary method 900 for accomplishing software administration via an application service provider scenario. At 912, a remote deployment utility (e.g., with push functionality) is provided via a network reference (e.g., an URL). For example, the network reference can refer to a location (e.g., a web server) maintained by an application service provider, and an administrator can acquire the remote deployment utility via the location. The remote deployment utility can then be installed behind the firewall so that an administrator can direct installation of appropriate software at nodes within the network (e.g., behind the firewall). Further details relating to the remote deployment installation utility can be found in U.S. Provisional Application No. 60/375,210, Melchione et al., entitled, "Executing Software In A Network Environment," filed Apr. 23, 2002, which is hereby incorporated herein by reference.

At 922, agent software is installed at nodes to be administered via the remote deployment utility. For example, an administrator can select a list of nodes at which the agent software is to be installed, and the remote deployment utility sends the software to the nodes and arranges for it to be installed at the nodes over a network connection (e.g., without having to physically visit the nodes).

At 932, an administrative user interface is provided via a network reference. For example, the network reference can refer to a location (e.g., a web server) maintained by an application service provider. The administrative user interface can provide a variety of functions by which an administrator can administer software at administered nodes, including distributing software in stages as described herein.

At 942, administration information is collected from an administrator via the network. For example, various web pages can be presented by which an administrator selects various options and configuration directives. The options and configuration directives can include placing nodes into named groups and associating the named groups with a software stage. The user interface and administration information can be communicated via an HTTP-based protocol. Accordingly, the information can pass through a firewall.

At 952, the agent software at the administered nodes periodically queries the application service provider (e.g., a data center) to determine what configuration directives need to be carried out at the node. The queries and returned information can be communicated via an HTTP-based protocol. Accordingly, the information can pass through a firewall.

In the case of software distribution, the application service provider can provide a list of software (e.g., listing a software package containing software of a stage as designated by the administrator) that should reside at the node at 962 in response to a query by an agent.

At 972, the agent can pull down the appropriate software (e.g., a software package) and install it at the node 982.

In the case of an application service provider scenario using the Internet, software administration can thus be accomplished from any device having access to the Internet. Thus, a network behind a firewall can be administered via the Internet, even by an administrator employing a device (e.g., a web browsing computer) outside the firewall.

Figure 10:
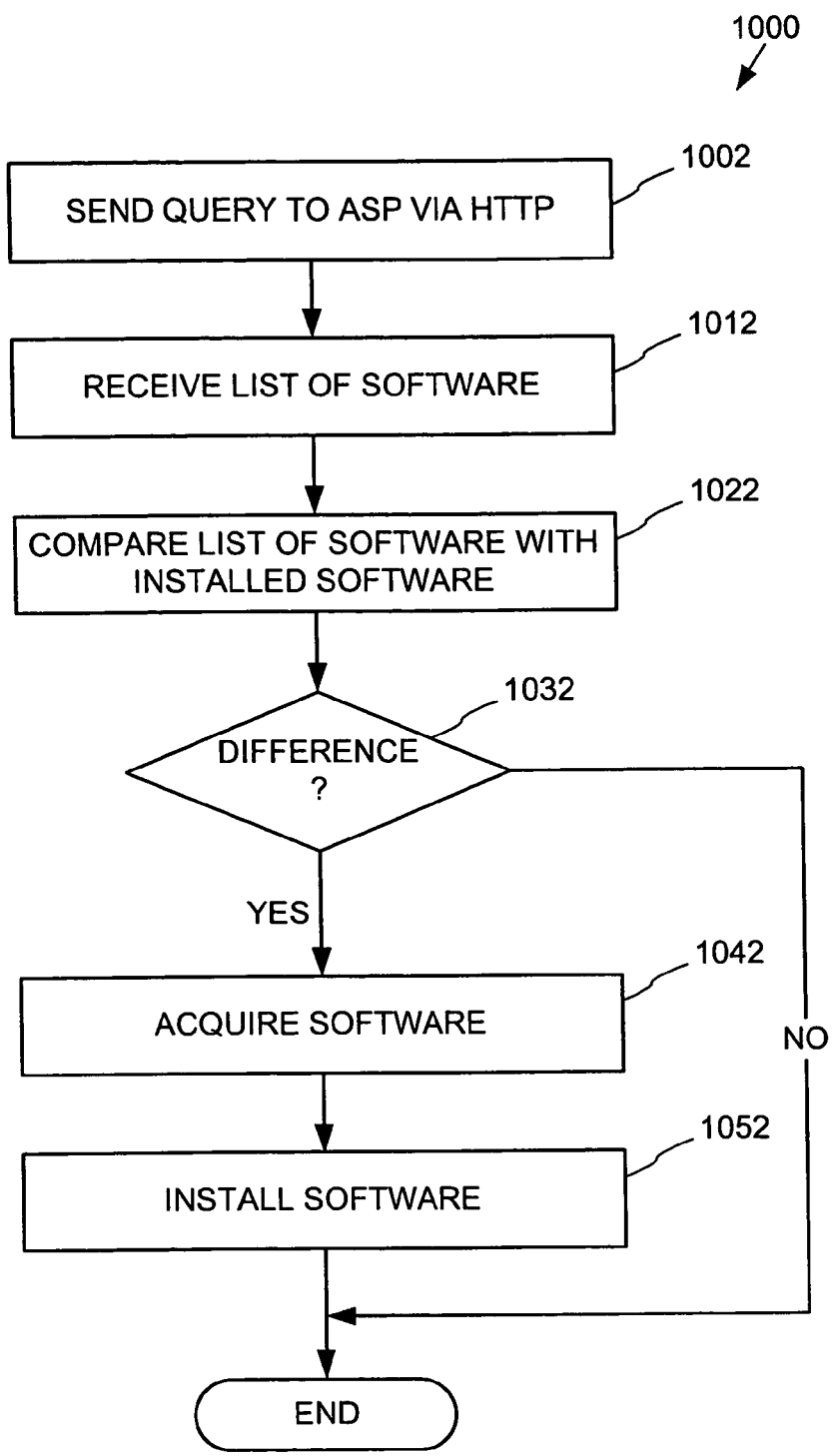
FIG. 10 is a flow chart depicting an exemplary method for accomplishing a software administration function over a network.

FIG. 10 depicts an exemplary method 1000 for accomplishing a software administration function over a network. In the example, software of an appropriate stage is provided to a node behind a firewall. However, other arrangements are possible, such as providing software within the firewall.

At 1002, an HTTP-based protocol request is sent to an application service provider (e.g., a web server at a data center). For example, an agent can send a GET or POST request by which certain parameters can be placed in the request. For instance, a node identifier can be passed to the server. The request can be periodically generated (e.g., according to 952 of FIG. 9). The frequency of the request can be controlled by an administrator via manipulation of web pages.

At 1012, in response to the request, the server provides a list of software that should be installed at the requesting node. The list can be generated with reference to the stage information for the node. For example, if the node belongs to a group designated to receive software of stage 2, a list of such software can be provided. A distribution threshold can also be taken into account.

At 1022, the list of software provided is compared with the software installed on the node (e.g., by the agent).

At 1032, it is determined whether there are any differences between the list and the software installed on the node. If there are no differences, processing for software distribution can end. Other processing may be appropriate for carrying out additional configuration directives (e.g., adjusting the periodic request interval).

If it is determined that there are differences, the software is acquired at 1042 and installed at 1052. The software may be acquired in a variety of ways, such as via an HTTP-based protocol. For example, the software may reside at a server maintained by the application service provider, at a mirror site, or at a location within the network (e.g., behind the firewall) if desired.

The list can be interpreted so that software not appearing in the list is uninstalled from the node (e.g., by the agent). Old software distribution units may be retained so they can be provided to other nodes (e.g., in a peer-to-peer arrangement).

Although administration can be accomplished via an application service provider scenario as illustrated, functionality of the software being administered need not be so provided. For example, a hybrid situation may exist where administration and distribution of the software is performed via an application service provider scenario, but components of the software being administered reside locally at the nodes.

EXAMPLE 7

Software Distribution Over Many Enterprises

In some situations, it may be desirable for one vendor to host application services for more than one organization. For example, a vendor can host a plurality of customers to avoid having a data center for each customer, to avoid having to hire separate staff for each customer, or to otherwise reduce the cost of providing the services. The technologies described herein can be implemented in such a scenario.

Figure 11:
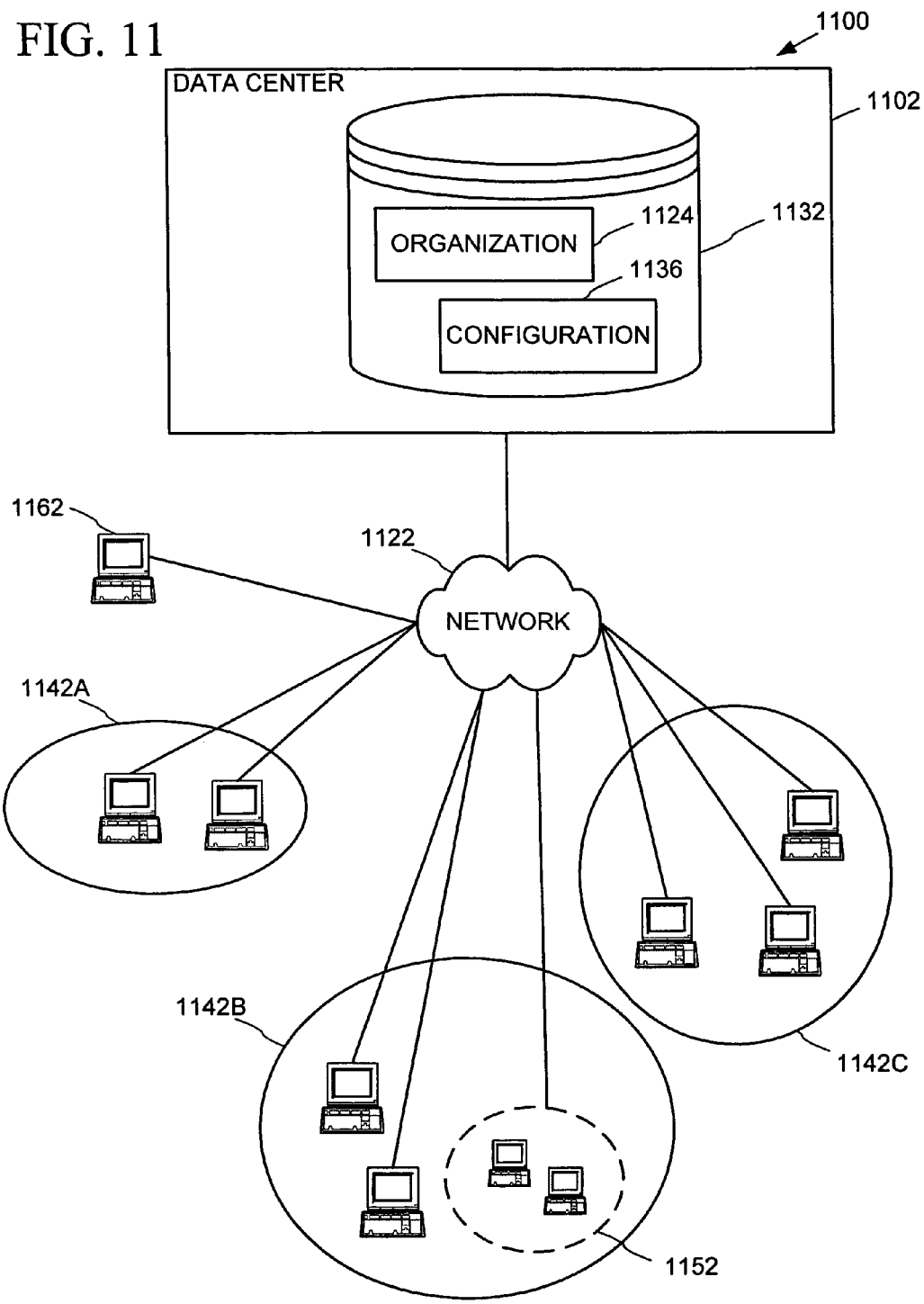
FIG. 11 depicts an exemplary scenario in which a vendor hosts application services for more than one organization.

FIG. 11 depicts an exemplary scenario 1100 in which a vendor hosts application services for more than one customer. The vendor can act as an application service provider or delegate the hosting responsibilities to another entity if desired. Also, it is possible for one application service provider to provide services for a plurality of vendors. It is also possible for the pictured scenario 1100 to be applied to a single organization (e.g., departments or geographical locations can be considered sub-organizations within such an organization).

In the example, a data center 1102 can include a variety of hardware and software (e.g., web servers) for processing requests from a variety of nodes via the network 1122. The network 1122 may be the Internet or some other network. In the case of the Internet, there may be one or more firewalls between the data center 1102 and the nodes administered.

The data center 1102 can include a database 1132 that has an organization table 1134 and one or more configuration tables 1136. In this way, the database 1132 can track which nodes belong to which organization (e.g., via a nodes table) and the configuration appropriate for the nodes. Various other tables can also be included (e.g., a groups table). In some cases, an organization may be sensitive to having its information commingled with other organizations, so a separate table, a separate database, a separate server, or a separate data center 1102 can be maintained for such organizations, if desired.

As shown, three organizations 1142A, 1142B, and 1142C are availing themselves of the services provided by the application service provider via the data center 1102 over the network 1122. Within the organization, nodes can be associated into groups or subnets (e.g., the group 1152). Administration can be accomplished by an administrator accessing the data center 1102 (e.g., via an HTTP-based protocol) from within the respective organization, group, or subnet.

It is also possible that the organizations be administered by yet another entity via another computer 1162. For example, a consulting firm can perform software administration functions for the three organizations by accessing web pages over the Internet. The initial installation of agents to the nodes may be challenging in a situation where no administrator is behind the organization's firewall, but such installation can be accomplished by emailing an appropriate hyperlink to a user at the node. When activated, the hyperlink can install the appropriate agent software.

Distribution of software via stages as described herein can be administered via any of the illustrated scenarios. For example, an administrator inside or outside of an organization can access the data center 1102 to manipulate configuration settings designating nodes be distributed software of an appropriate stage. Security measures can be put into place to prevent unauthorized manipulation of configuration settings.

EXAMPLE 8

Groups

Various nodes can be placed into named groups to facilitate administration of a large number of nodes. For example, a set of nodes can be placed into a group named "lab" to designate that the nodes are machines in a lab where software functionality is tested. A group can have one or more nodes and be associated with a group name.

The named group can then be associated with various configuration directives, including association with a software stage. In the example of the "lab" group, the nodes might be associated with an initial (e.g., beta) stage so that the computers in the lab are the first to receive a new version of software.

EXAMPLE 9

Policies

A set of configuration directives can be grouped into a named set called a policy. The policy can include a stage of software to be distributed to nodes associated with the policy. The policy can be associated with nodes via the group mechanism described above.

EXAMPLE 10

Beta, Early, and Live Stages

If desired, a three-stage software system can be used. For example, the earliest stage can be called "beta," a middle stage called "early," and the late stage called "live." Typically, beta software is that for which considerable additional feedback is sought by the developer. The middle stage is a more mature release, and the live version is considered to be one of the final releases of the software. However, other arrangements can be used.

EXAMPLE 11

Anti-Virus Software Administration

Figure 12:
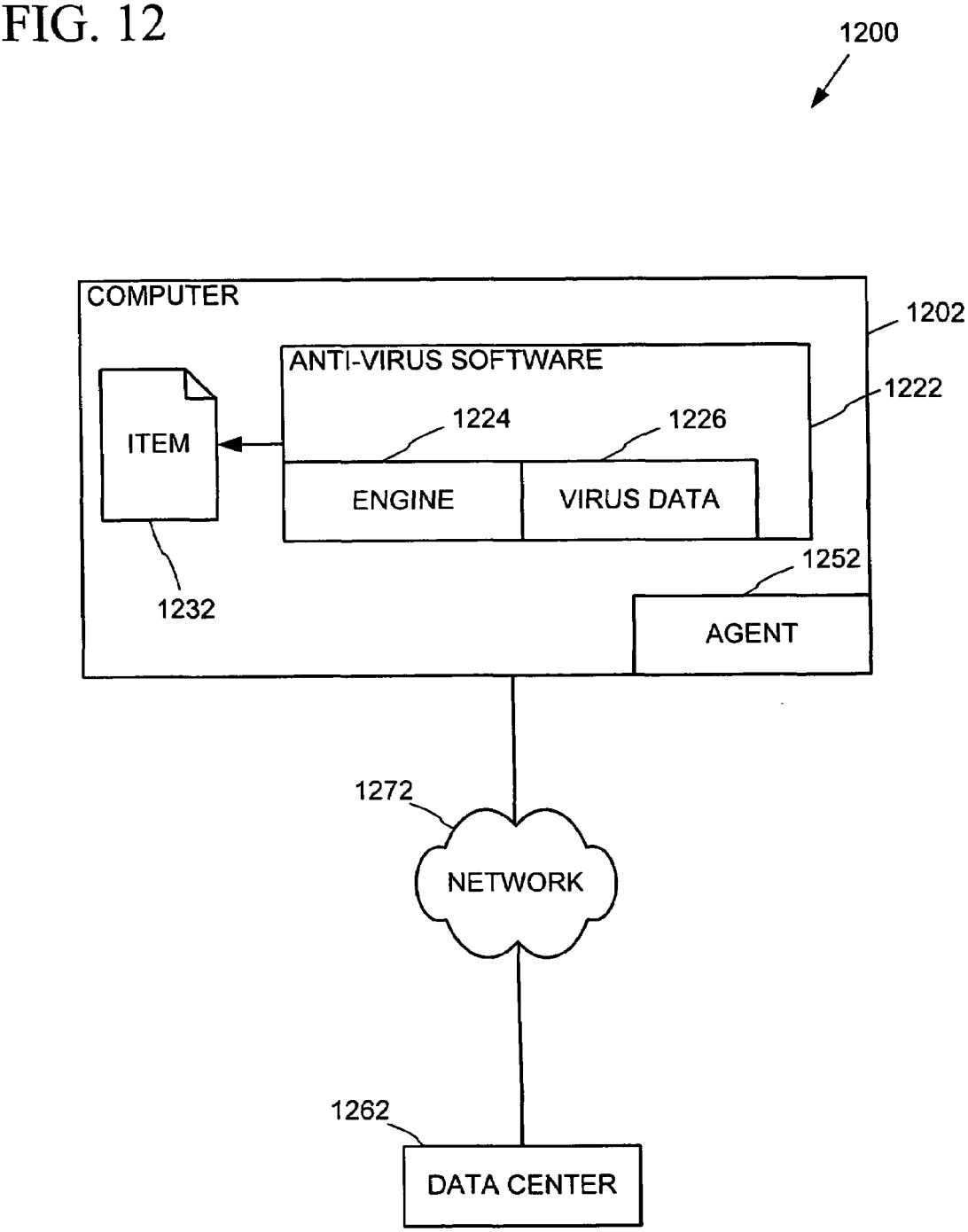
FIG. 12 is an exemplary arrangement involving anti-virus software.

In any of the examples described herein, the software being administered can be anti-virus software. An exemplary anti-virus software arrangement 1200 is shown in FIG. 12.

In the arrangement 1200, a computer 1202 (e.g., a node) is running the anti-virus software 1222. The anti-virus software 1222 may include a scanning engine 1224 and the virus data 1226. The scanning engine 1224 is operable to scan a variety of items (e.g., the item 1232) and makes use of the virus data 1226, which can contain virus signatures (e.g., data indicating a distinctive characteristic showing an item contains a virus). The virus data 1226 can be provided in the form of a file.

A variety of items can be checked for viruses (e.g., files on a file system, email attachments, files in web pages, scripts, etc.). Checking can be done upon access of an item or by periodic scans or on demand by a user or administrator (or both).

In the example, agent software 1252 communicates with a data center 1262 (e.g., operated by an application service provider) via a network 1272 (e.g., the Internet). Communication can be accomplished via an HTTP-based protocol. For example, the agent 1252 can send queries for updates to the virus data 1226 or other portions of the anti-virus software 1222 (e.g., the engine 1224).

EXAMPLE 12

Exemplary Implementation

FIGS. 13–17 are screen shots illustrating an exemplary implementation related to the above technologies. The screen shots show a user interface as presented by a web browser such as the Microsoft Internet Explorer software, which is marketed by Microsoft Corporation. Other software can be used, and either Internet (e.g., http://www.sitename-.com/xyz.asp) or intranet (e.g., http://subnet.companyname/xyz.asp) references can be used to acquire the user interfaces. The illustrated user interface can be provided by any number of software packages, including a server-side scripting environment (e.g., Microsoft active server pages technology) associated with a web server.

To acquire access to the application services, an organization can enter into a contractual arrangement with an application service provider vendor (e.g., by subscribing to the services and agreeing to pay a monthly fee). The application service provider can provide an appropriate network link and a user name and password by which an administrator can log into the system and begin administering the software.

As described above, an administrator can acquire an installation utility and remotely deploy and install agent software to the nodes to be administered. The administrator can then go about the process of configuring how the nodes are to be administered.

During the process, it may be desirable to place one or more nodes into a group. FIG. 13 shows a screen shot 1300 depicting an exemplary user interface for manipulating groups. A database of configuration information can be adjusted according to the administrator's selections.

It may also be desirable to place one or more configuration directives into a named set. Such a named set can then be assigned to a group as shown in FIG. 14, which shows an exemplary user interface 1400 for manipulating policies. One directive of the policy (i.e., "Release State") relates to the stage of the software to be distributed for the group. The stage can be specified as "Beta," "Early," or "Live."

The configuration directives can take many forms. For example, FIG. 15 shows an exemplary user interface for manipulating configuration directives related to an agent. Changes by an administrator are stored in a configuration database, and agents assigned the related policy are updated accordingly (e.g., when they contact the application service provider data center). The user interface for the administered software can be hidden via the options (e.g., "Show Agent UI"). Also, as shown, an option "Show Exit option" can be used to control whether an icon appears in an icon menu by which a user can exit the software running at a node.

Figure 16:
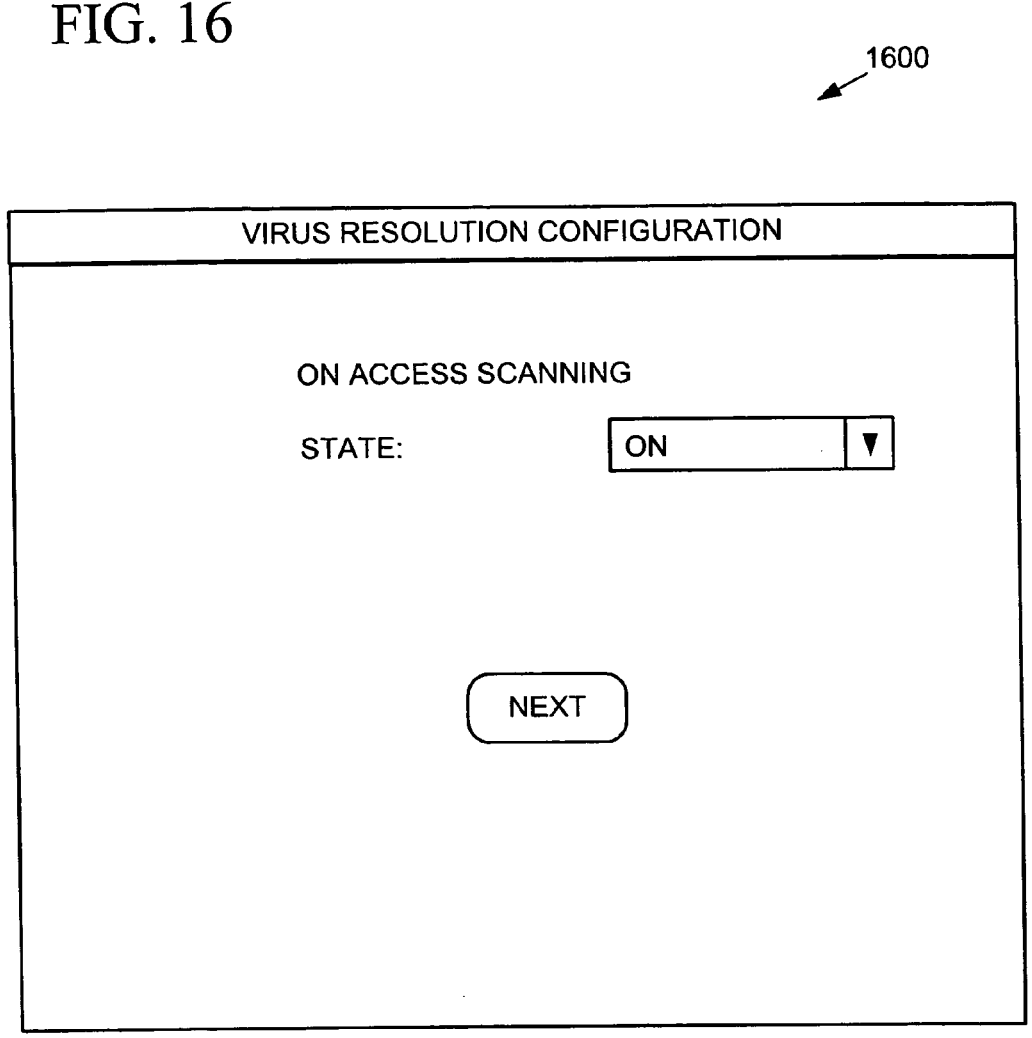
FIG. 16 is a screen shot showing an exemplary user interface for manipulating configuration directives related to virus infection resolution.

Other configuration directives are possible. FIG. 16 shows a configuration directive related to whether on-access scanning is enabled.

Figure 17:
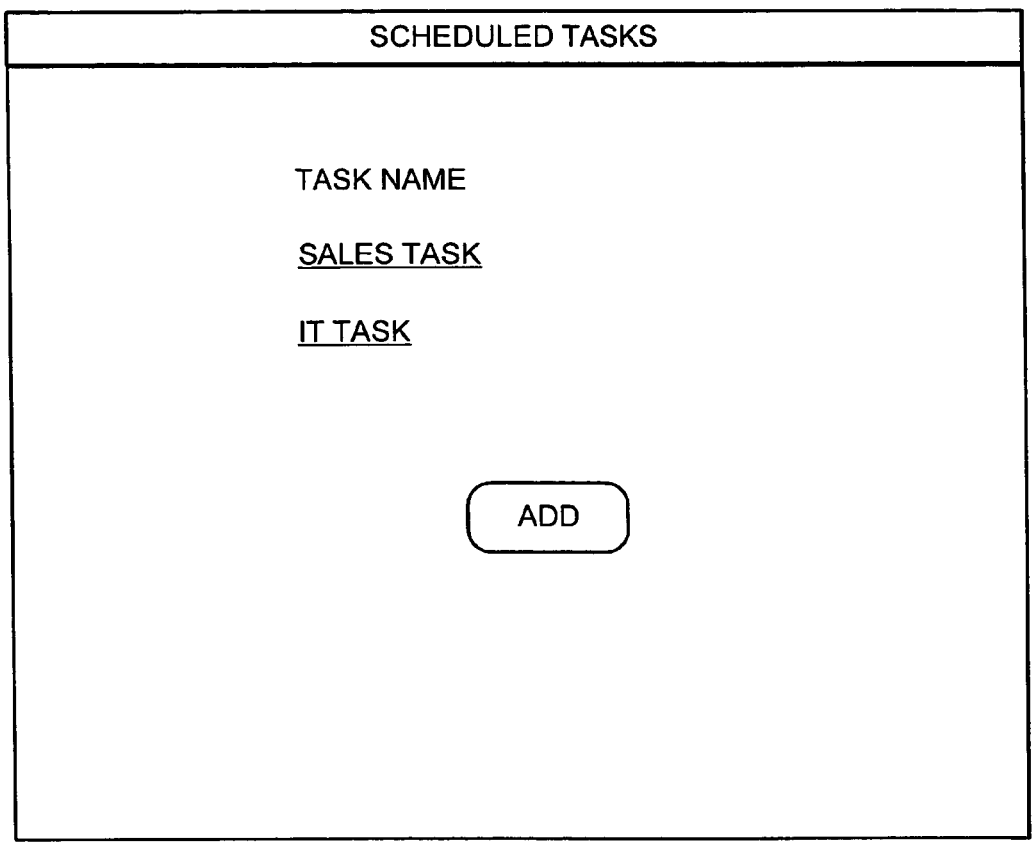
FIG. 17 is a screen shot showing an exemplary user interface for manipulating configuration directives related to scheduled tasks.
Figure 18B:
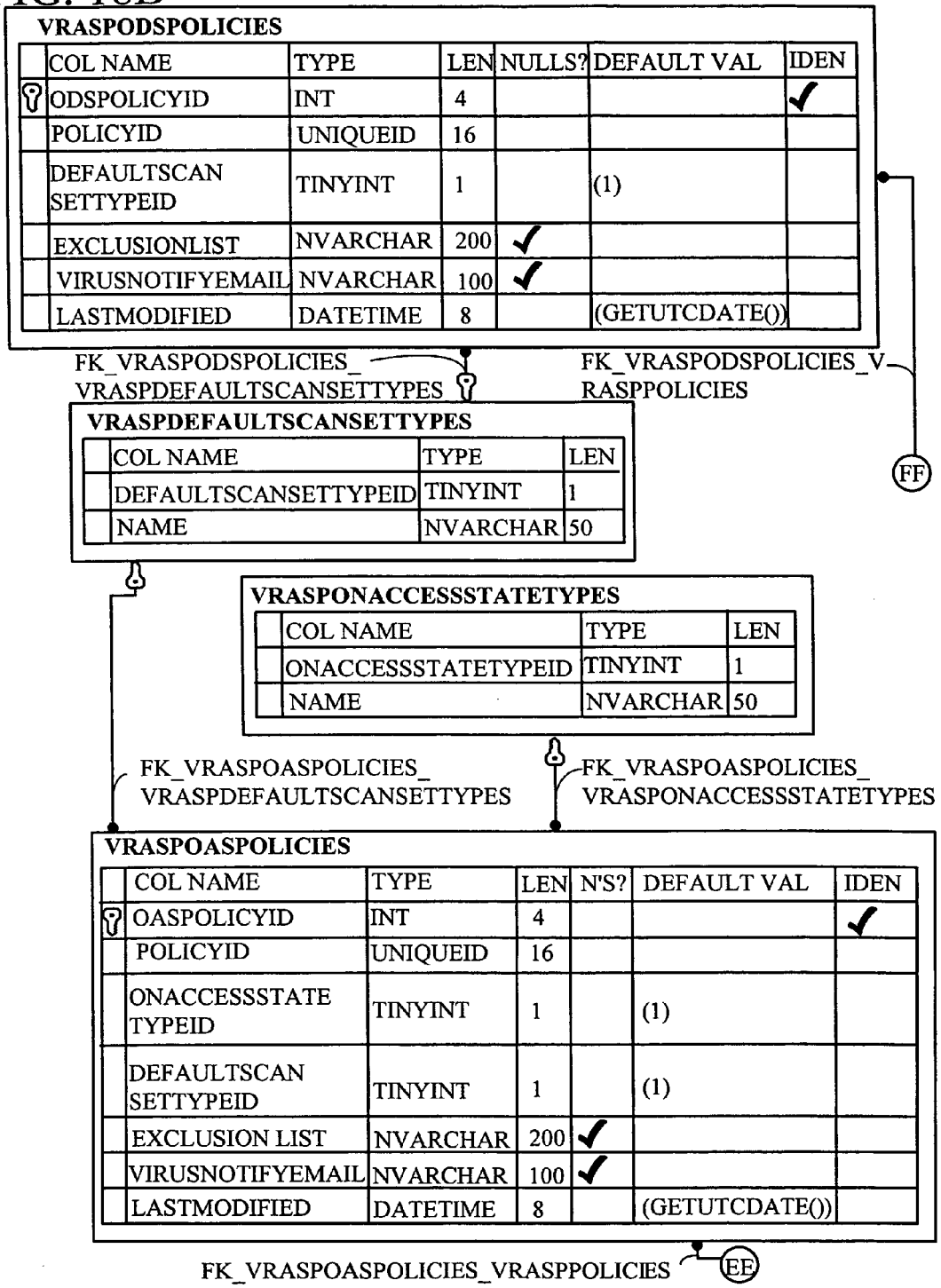
Figure 18C:
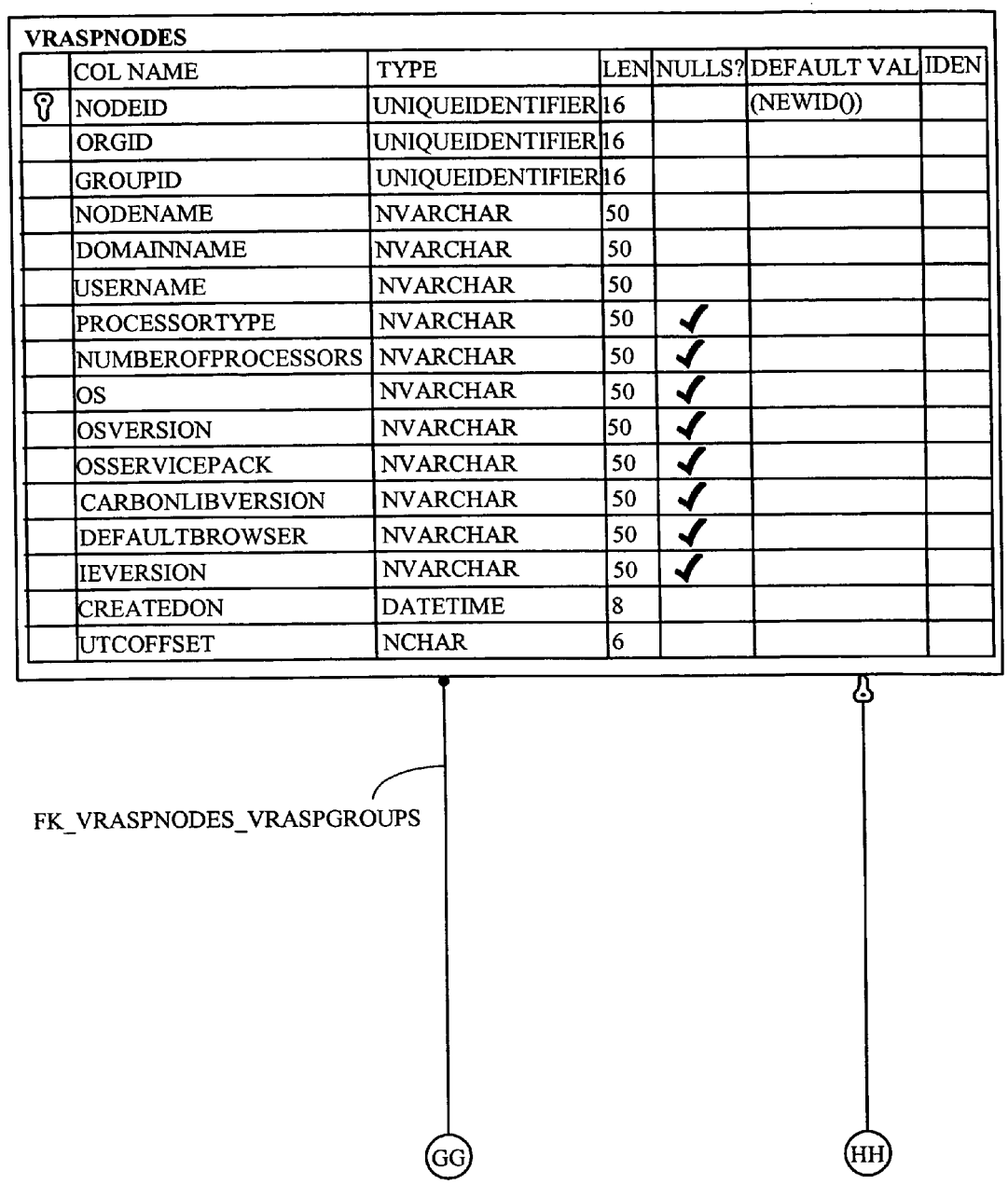
Figure 18D:
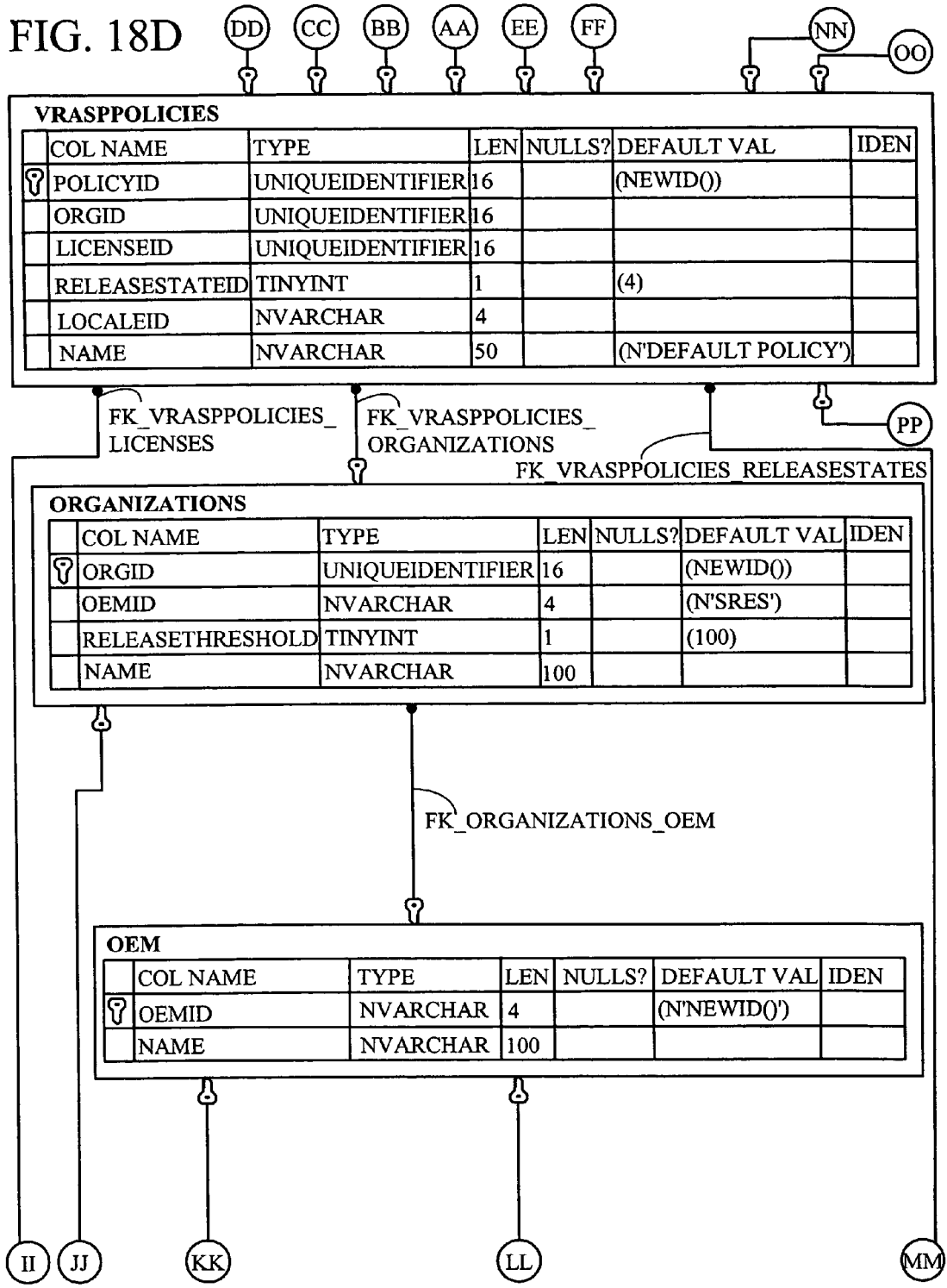
Figure 18E:
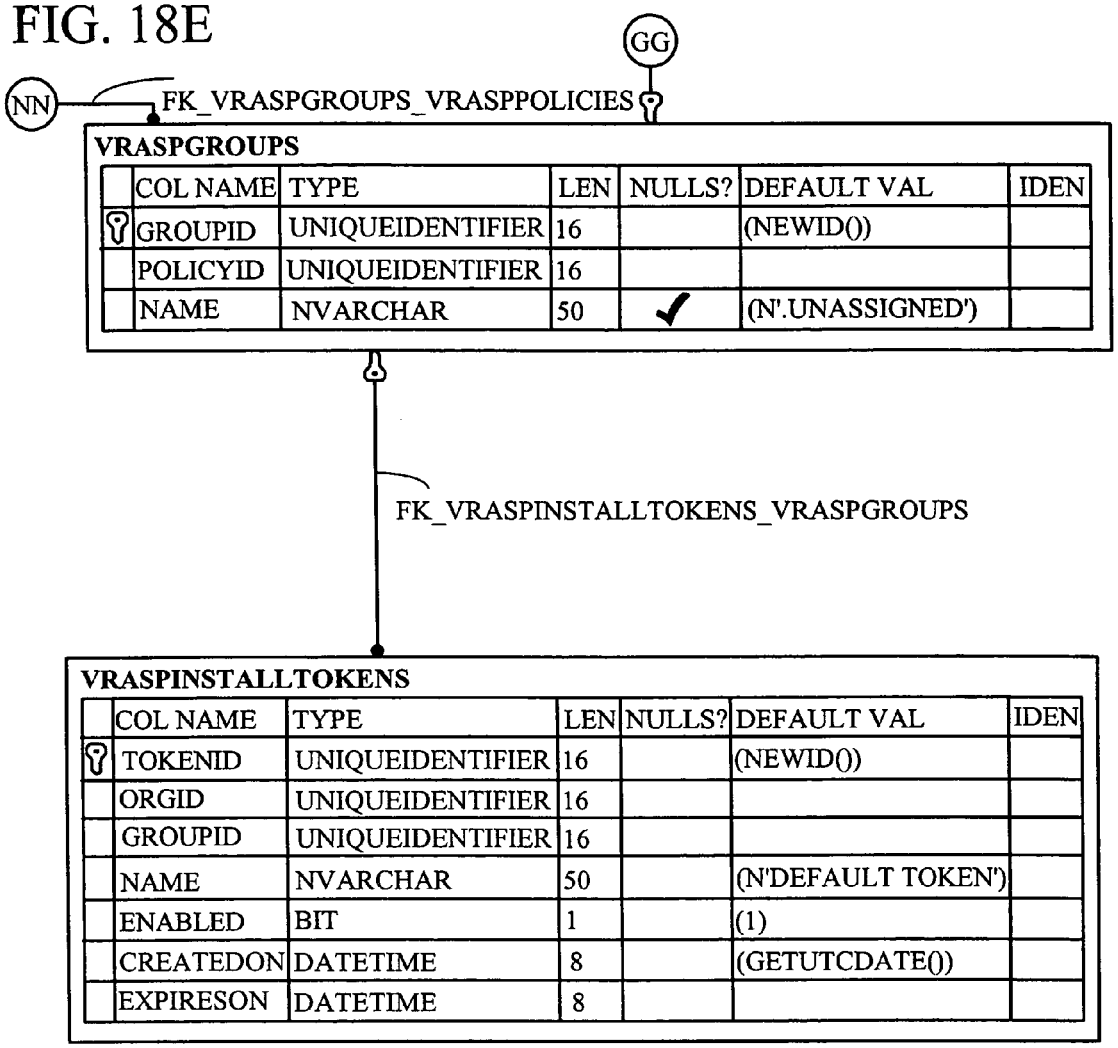
Figure 18F:
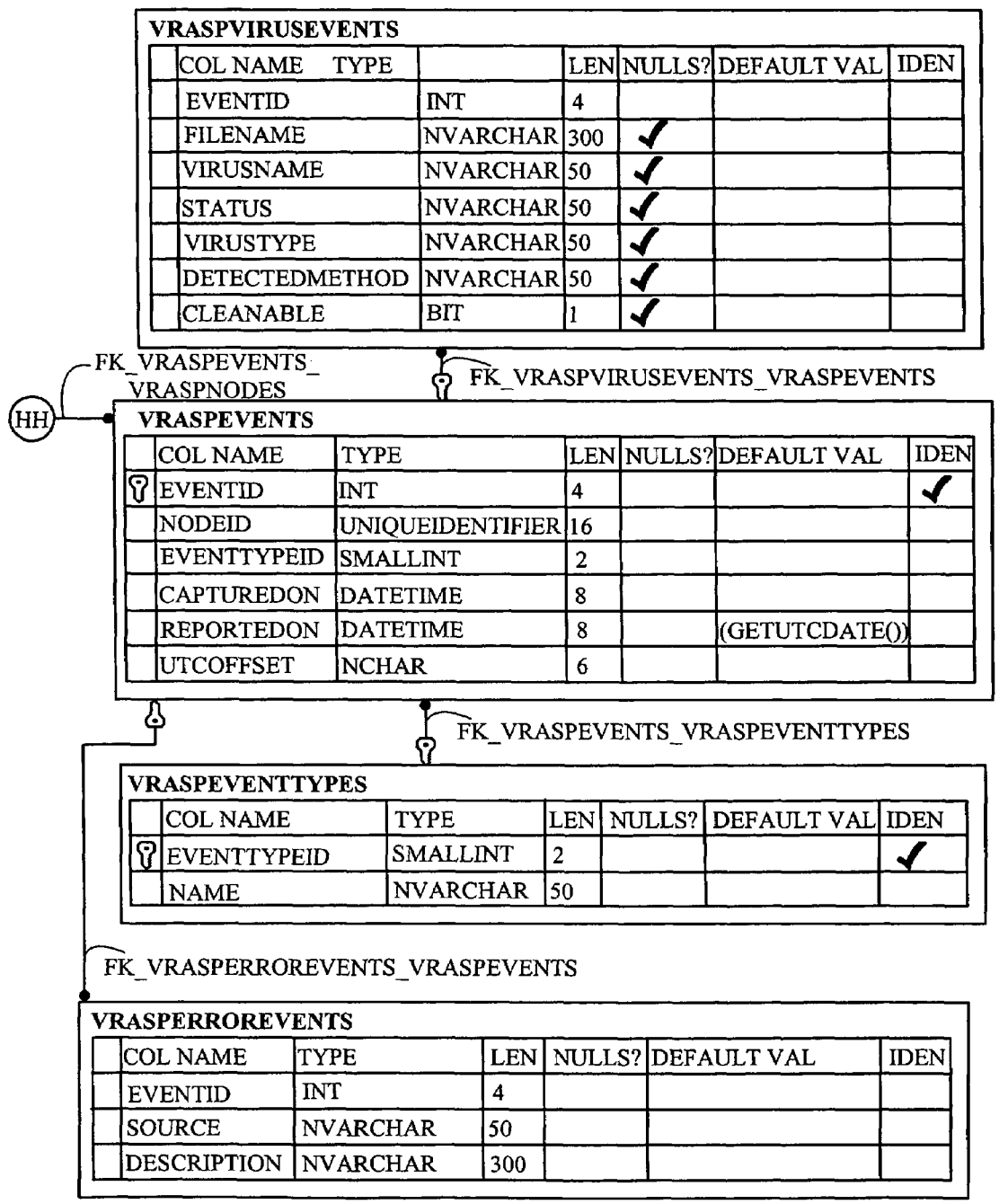
Figure 18G:
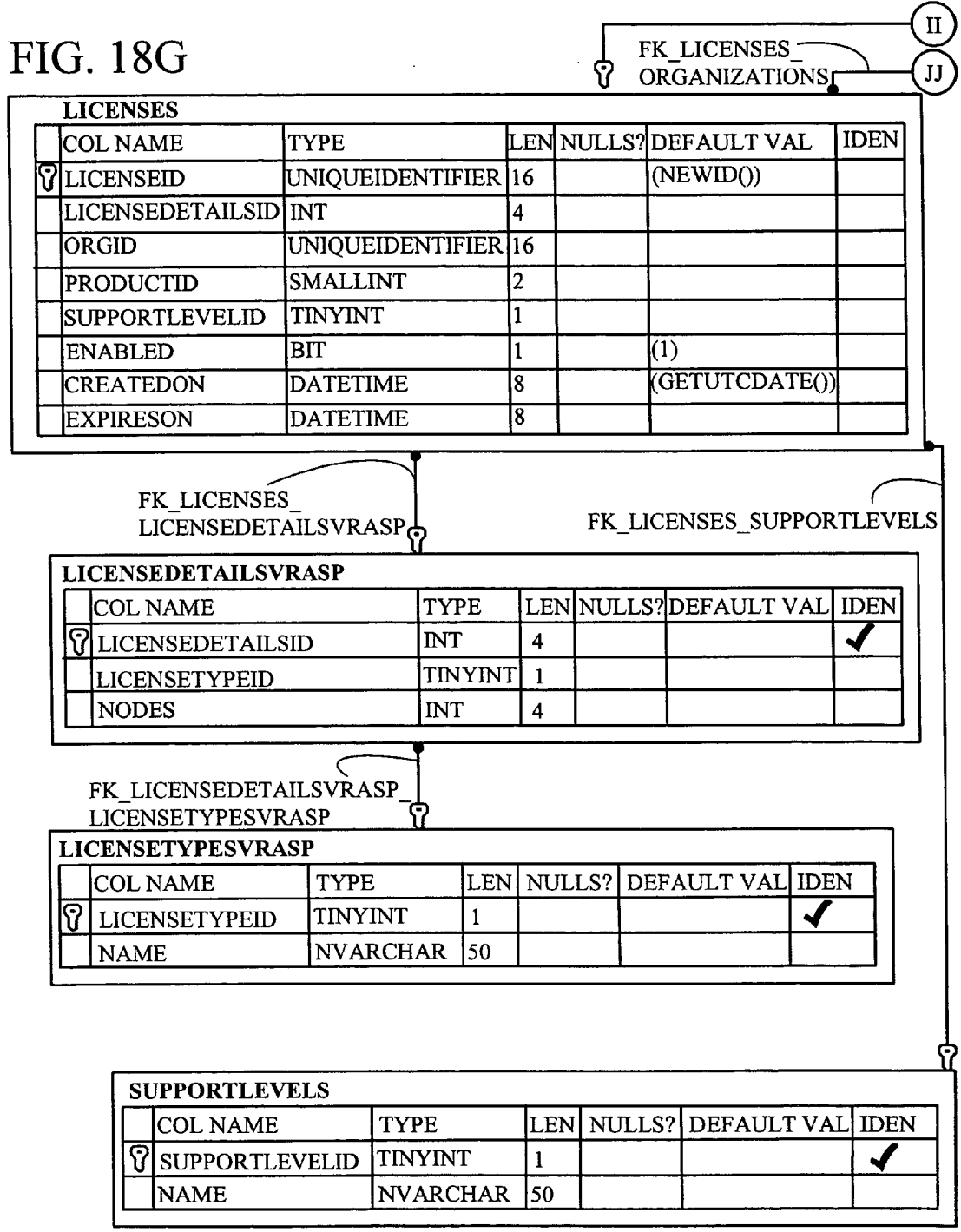
Figure 18H:
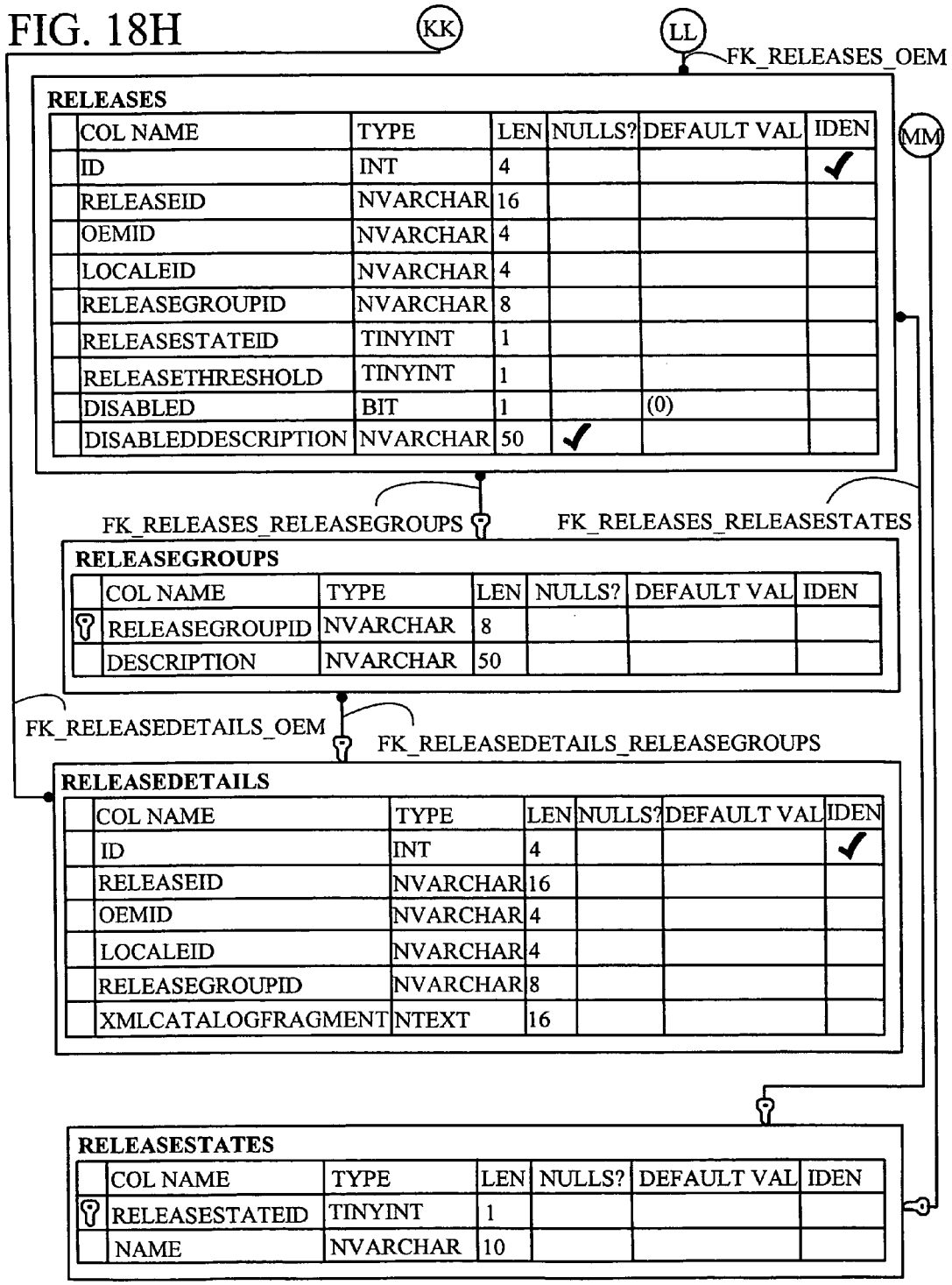
Figure 18I:

In addition, tasks can be scheduled for policies. For example, FIG. 17 is a screen shot showing an exemplary user interface 1700 by which an administrator can schedule tasks. Additional user interfaces can be presented by which tasks can be added and task recurrence can be specified. Additional recurrence parameters can be specified by another user interface (e.g., whether to occur every day or recur every n days, whether to recur indefinitely or n times, and whether to use default advanced settings, such as a jitter value, late limit, and maximum duration parameters). Alternatively, a task can be scheduled for a group.

Various other user interfaces can be presented. For example, a list of computers can be presented (e.g., indicating a computer name, domain, operating system, and group).

Software administration will proceed according to the configuration specified via the user interfaces. For example, if a group of computers has been assigned the "Beta" stage, upon availability of a software release associated with the "Beta" stage, queries from agents for appropriate software will be answered by providing a list including software of the "Beta" stage.

For example, agent software at a node can send an HTTP-based request to a data center, providing a node identifier unique to the node. In response, the data center can provide a list of software based on the configuration information specified by the administrator.

The agent software can then acquire the software it needs to conform with the configuration information specified by the administrator. In this way, automatic software distribution via stages can be accomplished.

When a new release becomes available (e.g., a software development team releases software), it can be added to an appropriate database with a reference indicating a location from which the release can be obtained. Subsequent queries from agents receive replies taking the new release into account. The software will thus percolate down to the agents as they request it. If a node is off-line (e.g., a mobile user having a computer not connected to a network), there may be some lag time, but upon connecting to the network, the agent can query the data center and an appropriate software list can be provided.

In the example, the list of software can be a list of files conforming to the .CAB file specification of Microsoft Corporation. If software administered by the system is installed but not listed in the list, the software is uninstalled. The .CAB file may remain on the node so that another node can access it (e.g., in a peer-to-peer arrangement).

At some point, the software life cycle may begin again or move to an earlier stage in some other way. In such a case, beta versions of the software will be distributed to those nodes associated with a group that is associated with a policy specifying beta software.

There may be more than one version of the software (e.g., a beta of 1.0 and a beta of 2.0); however, a versionless system can be used from the administrator's point of view (e.g., there is a beta release of the software, but no version need be associated with it).

In this way, software administration can be accomplished via an application service provider scenario. Although administration can include a wide variety of functions, the illustrated example enables monitoring (e.g., for producing reports of virus infection), configuration, and installation of software. In addition, the polled pull scenarios described can allow the system to operate even though there may be a firewall in place. Thus, application administration can be performed in such a way that software is automatically updated through a firewall. Such an arrangement can provide a valuable service in many situations, such as for a large enterprise's information technology department. Such an enterprise may have 10, 100, 1000, 10,000, 100,000, or more nodes.

Because more than one such enterprise can be served in an application service provider scenario, 10,000, 100,000, 1,000,000, 10,000,000, or more nodes can be administered by the described technologies.

EXAMPLE 13

Database Schema

FIGS. 18A–J show an exemplary database schema for implementing software administration via an application service provider scenario.

Figure 19A:
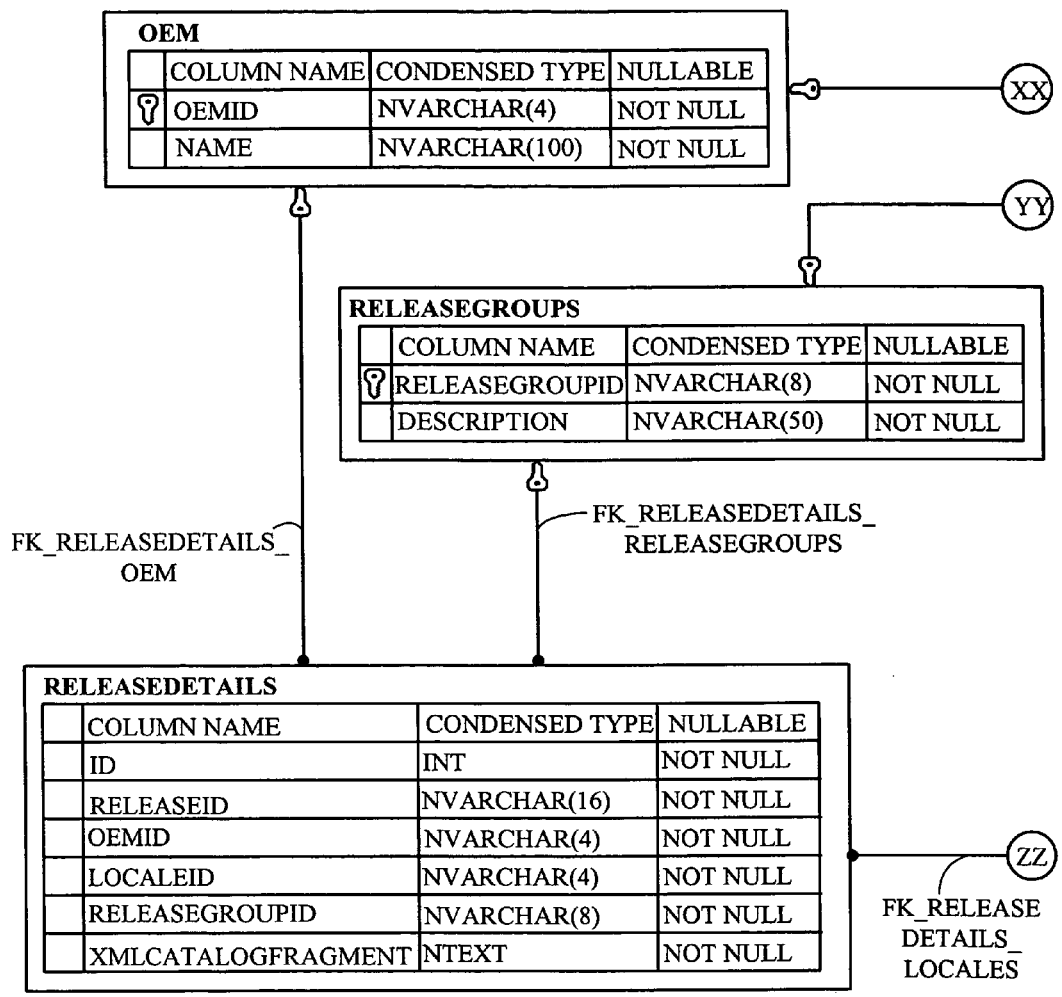
FIGS. 19A–19B show another exemplary database schema for use with an implementation of the technologies described herein.
Figure 19B:
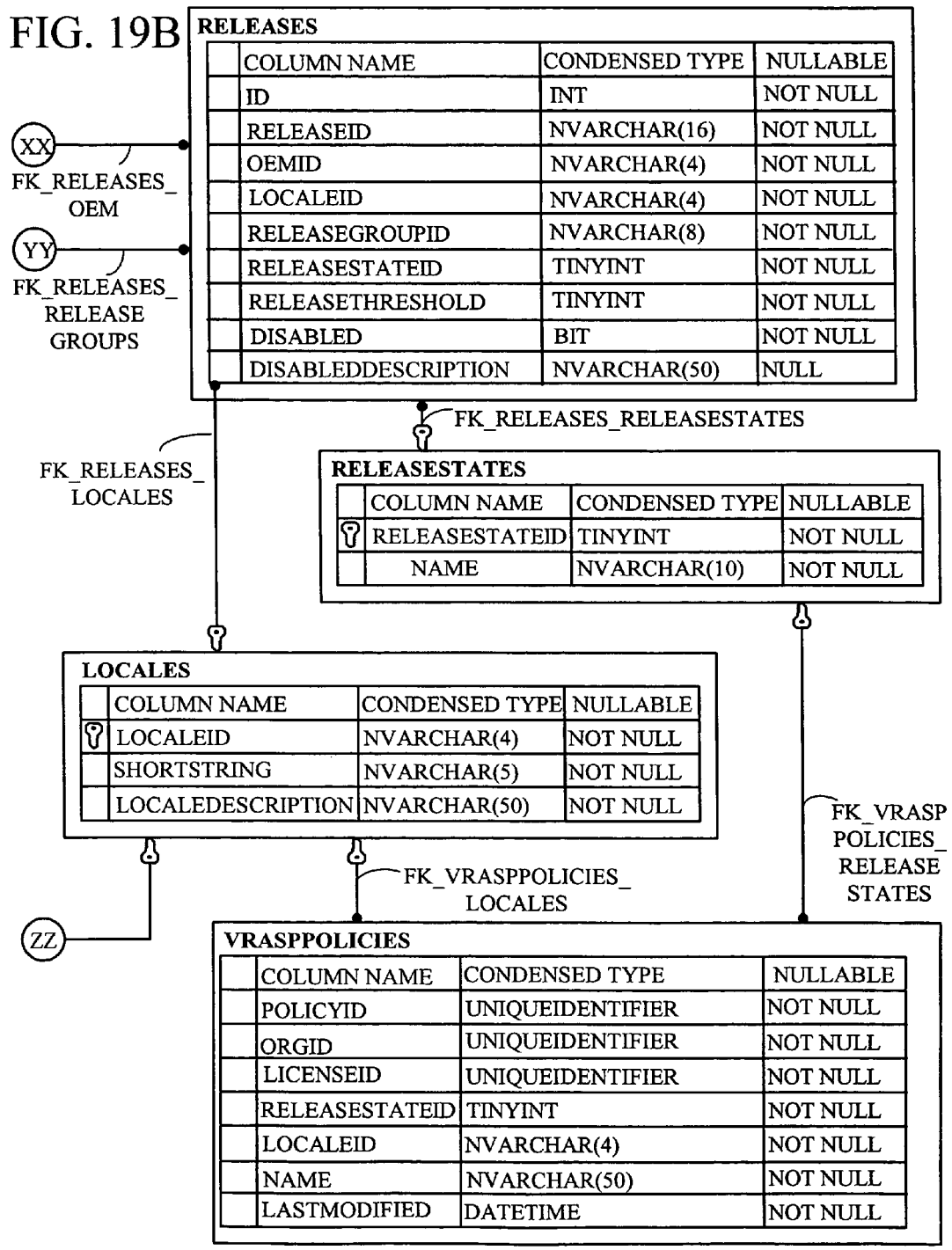

FIGS. 19A–B show another exemplary database schema for implementing software administration via an application service provider scenario.

The schema are examples only. A wide variety of other arrangements are possible, and another approach (e.g., XML) can be used.

Alternatives

Having described and illustrated the principles of our invention with reference to illustrated embodiments, it will be recognized that the illustrated embodiments can be modified in arrangement and detail without departing from such principles. It should be understood that the programs, processes, or methods described herein need not be related or limited to any particular type of computer apparatus. Various types of general purpose or specialized computer apparatus may be used with, or perform operations in accordance with, the teachings described herein. Elements of the illustrated embodiment shown in software may be implemented in hardware and vice versa.

Technologies from the preceding examples can be combined in various permutations as desired. Although some examples describe an application service provider scenario, the technologies can be directed to other arrangements. Similarly, although some examples describe anti-virus software, the technologies can be directed to other arrangements.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method of distributing software to a plurality of nodes, wherein the software exists in a plurality of releases, the method comprising:
    receiving one or more designations indicating one or more designated nodes operable to execute the software as nodes to be distributed software of a selected software stage;
    determining that one or more of the designated nodes is designated as to be distributed software of the selected software stage; and
    responsive to determining that the one or more of the designated nodes are so designated, selecting a release of the software associated with the selected software stage as to be distributed to the one or more of the designated nodes;
    wherein the release of the software of the selected software stage is released to nodes associated with a distribution threshold value after a progressing index reaches the distribution threshold value.

2. The method of claim 1 further comprising:
    distributing the selected release of the software to the one or more of the designated nodes.

3. The method of claim 1 wherein the designations are received via an application service provider scenario.

4. The method of claim 1 wherein the designations are received over the Internet.

5. The method of claim 1 wherein the receiving comprises:
    receiving a set of one or more configuration directives; and
    receiving a name associated with the configuration directives.

6. The method of claim 1 further comprising:
    receiving a request for a list of software from one of the nodes designated as to be distributed software of the selected stage; and responsive to the request, providing a list comprising the release of the software associated with the selected software stage.

7. The method of claim 6 wherein the request is sent via an HTTP-based protocol.

8. The method of claim 1 wherein the stages are associated with stage identifiers.

9. The method of claim 1 wherein the determining comprises comparing a distribution threshold value with the progressing index.

10. The method of claim 1 further comprising:
assigning a different distribution threshold value to different nodes;
wherein the determining comprises selecting the software stage according to the distribution threshold value.

11. The method of claim 1 wherein the release of the software associated with the selected software stage is so associated without regard to a version.

12. The method of claim 1 wherein:
the software release is associated with a date; and
the selecting comprises comparing the date.

13. The method of claim 1 wherein the designation indicates that a node is to be distributed software of the designated stage or a later-in-time release of a later stage, if any.

14. The method of claim 1 wherein the designations indicate that a node is to be distributed software of the designated stage or a release of a later stage, if any.

15. The method of claim 1 wherein the software executes at the nodes and is administered via an application service provider arrangement.

16. A method of facilitating software distribution to a plurality of nodes having access to a network, the method comprising:
via the network, receiving an indication of an association of at least one of the nodes with a software stage; and
after a version of software associated with the software stage becomes available, automatically distributing the version of the software to the nodes via the network;
wherein the distributing distributes the version of the software associated with the software stage to nodes associated with a distribution threshold value after a progressing index reaches the distribution threshold value.

17. The method of claim 16 wherein the indication is received from a data center in an application service provider scenario.

18. The method of claim 16 wherein the indication is received from a data center over the Internet.

19. The method of claim 16 wherein the distributing is initiated via a request by at least one of the nodes.

20. The method of claim 19 wherein the request is periodically automatically generated by a node.

21. A computer readable medium having computer-executable instructions for performing a method of distributing software to a plurality of nodes, wherein the software exists in a plurality of releases, the method comprising:
receiving one or more designations indicating one or more designated nodes operable to execute the software as nodes to be distributed software of a selected software stage;
determining that one or more of the designated nodes is designated as to be distributed software of the selected software stage; and
responsive to determining that the one or more of the designated nodes are so designated, selecting a release of the software associated with the selected software stage as to be distributed to the one or more of the designated nodes;
wherein the release of the software of the selected software stage is released to nodes associated with a distribution threshold value after a progressing index reaches the distribution threshold value.

22. A system for automatically distributing computer software via a network, the system comprising:
means for receiving information associating nodes with software stages; and
means for replying to requests from the nodes and providing a list of software of an appropriate stage out of the software stages wherein the software stages comprise a beta stage, a middle stage, and a late stage and wherein the list of software of the appropriate stage is released to a requesting node when a distribution controlling parameter reaches a value set for the requesting node.

23. The system of claim 22 wherein the means for replying to requests is operable to receive the requests via an HTTP-based protocol.

24. The system of claim 22 wherein the system automatically distributes software to 1,000,000 or more nodes.

25. The system of claim 22 wherein the system automatically distributes software to 10,000,000 or more nodes.

26. A computer user interface for designating a software stage for one or more nodes, the user interface comprising:
a user interface element by which a selected software stage can be designated for one or more designated nodes;
wherein the user interface element is presented by a data center, and responsive to activation of the user interface element, software of the selected software stage is automatically distributed by the data center to the one or more designated nodes according to a staggered distribution after a progressing index reaches a distribution threshold parameter associated with the one or more designated nodes.

27. A computer user interface of claim 26 wherein the data center provides the user interface element via an application service provider scenario.

* * * * *

UNITED STATES PATENT AND TRADEMARK OFFICE
CERTIFICATE OF CORRECTION

PATENT NO. : 7,178,144 B2
APPLICATION NO. : 10/421645
DATED : February 13, 2007
INVENTOR(S) : Melchione et al.

It is certified that error appears in the above-identified patent and that said Letters Patent is hereby corrected as shown below:

On the Title Page Item [56]

In Other Publications, "english/recover2_3" should read --english/recover/recover2_3--.

In Other Publications, "htpp" should read --http--.

In Other Publications, "naicommmon" should read --naicommon--.

In the Specification

Column 9, line 27 "the CAB file" should read --the .CAB file--.

In the Claims

Column 18, line 53 claim 27 "scenano" should read --scenario--.

Signed and Sealed this

Tenth Day of March, 2009

JOHN DOLL
*Acting Director of the United States Patent and Trademark Office*